United States Patent
Peterson et al.

(10) Patent No.: US 8,646,981 B2
(45) Date of Patent: Feb. 11, 2014

(54) BEARING ELEMENTS, BEARING ASSEMBLIES, AND RELATED METHODS

(75) Inventors: S. Barrett Peterson, Orem, UT (US); Craig H. Cooley, Saratoga Springs, UT (US); Timothy N. Sexton, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/550,825

(22) Filed: Jul. 17, 2012

(65) Prior Publication Data

US 2013/0182980 A1    Jul. 18, 2013

Related U.S. Application Data

(63) Continuation-in-part of application No. 13/089,725, filed on Apr. 19, 2011.

(51) Int. Cl.
*F16C 17/02* (2006.01)
*F16C 17/04* (2006.01)

(52) U.S. Cl.
USPC .......................................... 384/306; 384/309

(58) Field of Classification Search
USPC .............. 384/92, 95, 97, 117, 122, 215, 223, 384/284, 285, 306, 308, 309, 312; 175/320, 175/337, 371
See application file for complete search history.

(56) References Cited

U.S. PATENT DOCUMENTS

| | | |
|---|---|---|
| 3,201,184 A | 8/1965 | Hill |
| 3,745,623 A | 7/1973 | Wentorf, Jr. et al. |
| 3,817,586 A | 6/1974 | Elwell |
| 3,887,245 A | 6/1975 | Rouch |
| 4,077,682 A | 3/1978 | Gardner |
| 4,097,094 A | 6/1978 | Gardner |
| 4,268,276 A | 5/1981 | Bovenkerk |
| 4,274,900 A | 6/1981 | Mueller et al. |
| 4,296,976 A | 10/1981 | Heshmat |
| 4,403,873 A | 9/1983 | Gardner |
| 4,410,054 A | 10/1983 | Nagel et al. |

(Continued)

FOREIGN PATENT DOCUMENTS

| | | |
|---|---|---|
| KR | 748595 | 8/2007 |
| WO | WO 94/01690 | 1/1994 |
| WO | WO 2007/025117 | 3/2007 |

OTHER PUBLICATIONS

U.S. Appl. No. 13/550,831, filed Jul. 17, 2012, Barrett at al.

(Continued)

*Primary Examiner* — Phillip A Johnson
(74) *Attorney, Agent, or Firm* — Dorsey & Whitney LLP

(57) ABSTRACT

Bearing components, bearing assemblies and related methods are provided. In one embodiment, a bearing element includes a base layer and a polycrystalline diamond (PCD) layer comprising a plurality of PCD elements coupled with the base layer wherein each PCD element comprising a substrate and a diamond table. The plurality of PCD elements may be fit together to form a substantially continuous bearing surface. For example, the diamond tables may exhibit substantially square or rectangular geometries that are fit together to define the bearing surface. In other embodiments, the bearing elements may be spaced apart from one another. In other embodiments, the bearing element may include a single PCD element formed from a prefabricated PCD compact or cutting tool blank. Various bearing assemblies may incorporate such a bearing element including, for example, thrust bearings, journal bearings, and tilting pad bearing assemblies.

28 Claims, 33 Drawing Sheets

(56) References Cited

U.S. PATENT DOCUMENTS

| | | |
|---|---|---|
| 4,468,138 A | 8/1984 | Nagel |
| 4,501,505 A | 2/1985 | Chambers et al. |
| 4,525,083 A | 6/1985 | Pedersen |
| 4,544,285 A | 10/1985 | Shapiro et al. |
| 4,560,014 A | 12/1985 | Geczy |
| 4,662,348 A | 5/1987 | Hall et al. |
| 4,720,199 A | 1/1988 | Geczy et al. |
| 4,729,440 A | 3/1988 | Hall |
| 4,738,322 A | 4/1988 | Hall et al. |
| 4,738,550 A | 4/1988 | Gardner |
| 4,756,631 A | 7/1988 | Jones |
| 4,764,036 A | 8/1988 | McPherson |
| 4,811,801 A | 3/1989 | Salesky et al. |
| 4,824,263 A | 4/1989 | Singh |
| 4,913,247 A | 4/1990 | Jones |
| 4,927,275 A * | 5/1990 | Lawson ............... 384/117 |
| 5,016,718 A | 5/1991 | Tandberg |
| 5,092,687 A * | 3/1992 | Hall ............... 384/303 |
| 5,120,327 A | 6/1992 | Dennis |
| 5,135,061 A | 8/1992 | Newton, Jr. |
| 5,137,373 A | 8/1992 | Ide et al. |
| 5,154,245 A | 10/1992 | Waldenstrom et al. |
| 5,180,022 A | 1/1993 | Brady |
| 5,364,192 A | 11/1994 | Damm et al. |
| 5,368,398 A | 11/1994 | Damm et al. |
| 5,393,145 A | 2/1995 | Ide |
| 5,460,233 A | 10/1995 | Meany et al. |
| 5,480,233 A | 1/1996 | Cunningham |
| 5,544,713 A | 8/1996 | Dennis |
| 6,190,050 B1 | 2/2001 | Campbell |
| 6,736,542 B2 | 5/2004 | Hudson et al. |
| 6,793,681 B1 | 9/2004 | Pope et al. |
| 7,060,641 B2 | 6/2006 | Qian et al. |
| 7,533,739 B2 | 5/2009 | Cooley et al. |
| 7,552,782 B1 | 6/2009 | Sexton et al. |
| 7,635,035 B1 | 12/2009 | Bertagnolli et al. |
| 7,866,418 B2 | 1/2011 | Bertagnolli et al. |
| 7,870,913 B1 | 1/2011 | Sexton et al. |
| 7,901,137 B1 | 3/2011 | Peterson |
| 7,942,218 B2 | 5/2011 | Cooley et al. |
| 8,118,117 B2 | 2/2012 | Ide et al. |
| 8,146,687 B1 | 4/2012 | Vail |
| 2003/0012468 A1 | 1/2003 | New |
| 2004/0190804 A1 | 9/2004 | John et al. |
| 2007/0046120 A1 | 3/2007 | Cooley et al. |
| 2009/0268995 A1 | 10/2009 | Ide et al. |
| 2010/0237621 A1 | 9/2010 | Tessier et al. |
| 2010/0288558 A1 | 11/2010 | Sexton |
| 2012/0037425 A1 | 2/2012 | Sexton et al. |

OTHER PUBLICATIONS

International Search Report and Written Opinion from International Application No. PCT/US2012/033206 mailed Jul. 19, 2012.
U.S. Appl. No. 13/791,052, filed Mar. 8, 2013, Cooley et al.
U.S. Appl. No. 13/089,725, filed Mar. 6, 2013, Notice of Allowance.
U.S. Appl. No. 13/089,725, filed Apr. 5, 2013, Supplemental Notice of Allowance.
U.S. Appl. No. 13/550,831, filed Mar. 25, 2013, Office Action.
U.S. Appl. No. 13/089,725, filed Apr. 19, 2011, Cooley et al.
U.S. Appl. No. 11/545,929, filed Oct. 10, 2006, Bertagnolli et al.
U.S. Appl. No. 12/425,304, filed Apr. 16, 2009, Peterson et al.
U.S. Appl. No. 12/495,986, filed Jul. 1, 2009, Bertagnolli et al.
U.S. Appl. No. 12/761,535, filed Apr. 16, 2010, Scott et al.
U.S. Appl. No. 13/070,636, filed Mar. 24, 2011, Qian et al.
U.S. Appl. No. 13/087,775, filed Apr. 15, 2011, Miess et al.
U.S. Appl. No. 13/166,007, filed Jun. 22, 2011, Chapman et al.
U.S. Appl. No. 13/089,725, Feb. 14, 2013, Notice of Allowance.
U.S. Appl. No. 13/089,725, May 22, 2013, Notice of Allowance.
U.S. Appl. No. 13/550,825, Jun. 17, 2013, Notice of Allowance.
U.S. Appl. No. 13/089,725, Jul. 12, 2013, Supplemental Notice of Allowance.
U.S. Appl. No. 13/550,831, Jul. 11, 2013, Notice of Allowance.
U.S. Appl. No. 13/791,052, May 29, 2013, Notice of Allowance.
U.S. Appl. No. 13/791,052, Jul. 23, 2013, Supplemental Notice of Allowance.
U.S. Appl. No. 14/012,663, filed Aug. 28, 2013, Cooley et al.
U.S. Appl. No. 13/089,725, Sep. 11, 2013, Issue Notification.
U.S. Appl. No. 13/791,052 Sep. 11, 2013, Issue Notification.
International Search Report and Written Opinion from International Application No. PCT/US2013/049228 mailed Sep. 25, 2013.
International Search Report and Written Opinion from International Application No. PCT/US2013/049208 mailed Oct. 8, 2013.
U.S. Appl. No. 13/550,831, Sep. 26, 2013, Notice of Allowance.
U.S. Appl. No. 13/550,831, Nov. 7, 2013, Notice of Allowance.
U.S. Appl. No. 14/012,663, Oct. 18, 2013, Office Action.

* cited by examiner

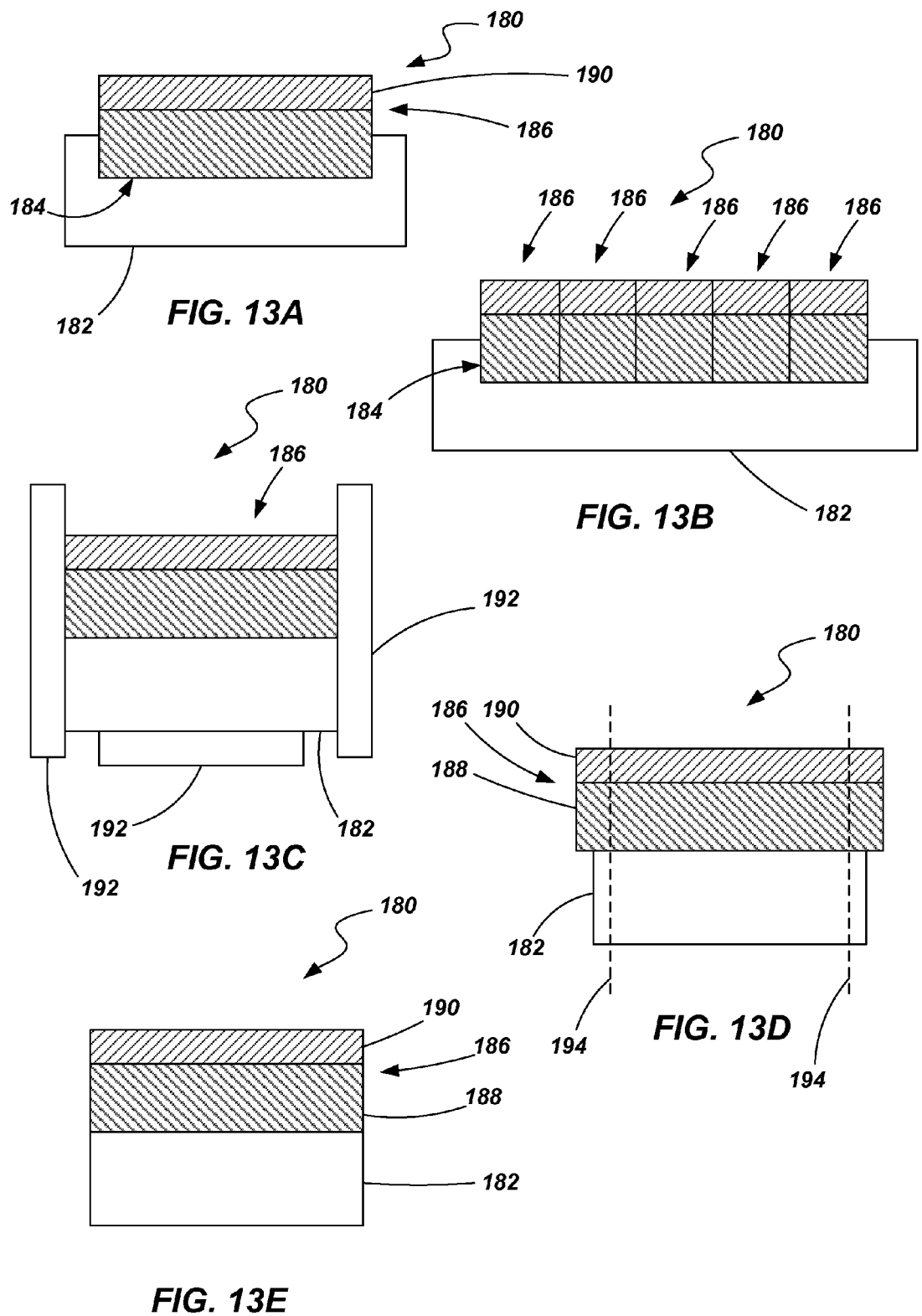

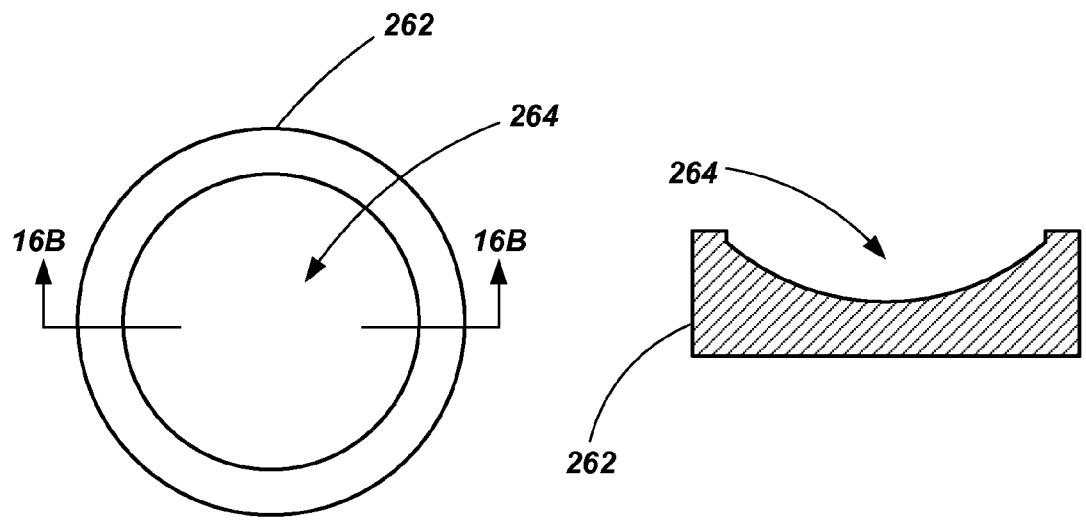
FIG. 16A
FIG. 16B
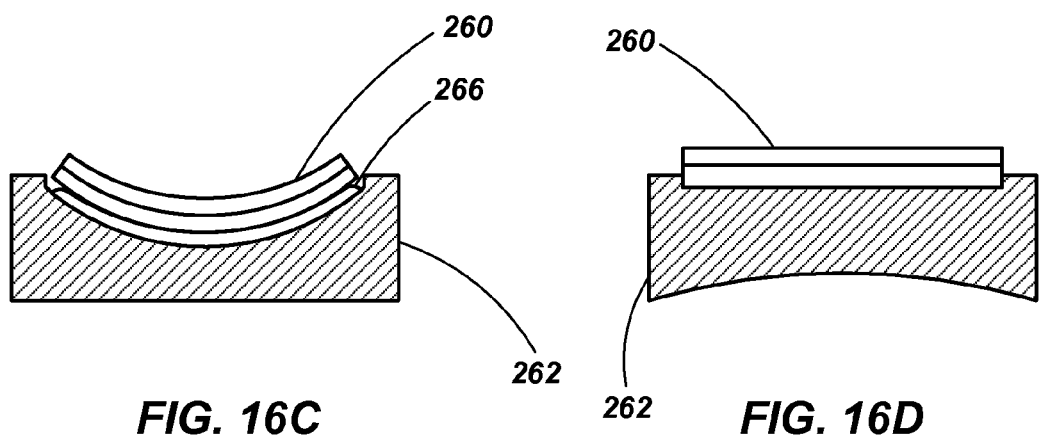
FIG. 16C
FIG. 16D

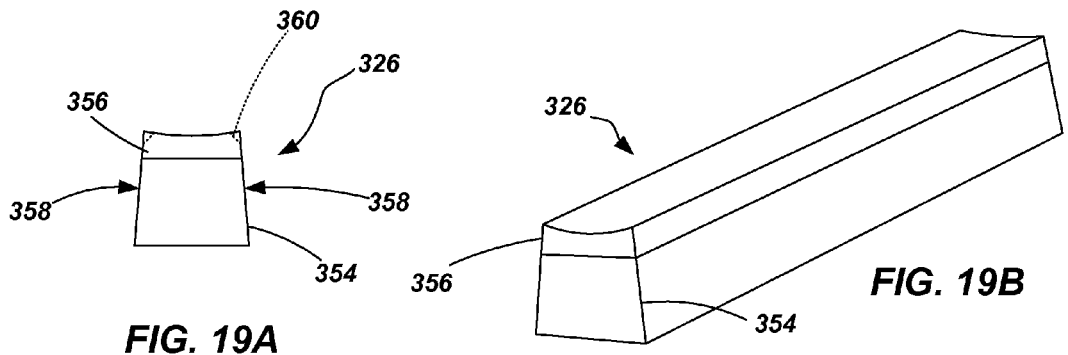
*FIG. 19A*  *FIG. 19B*
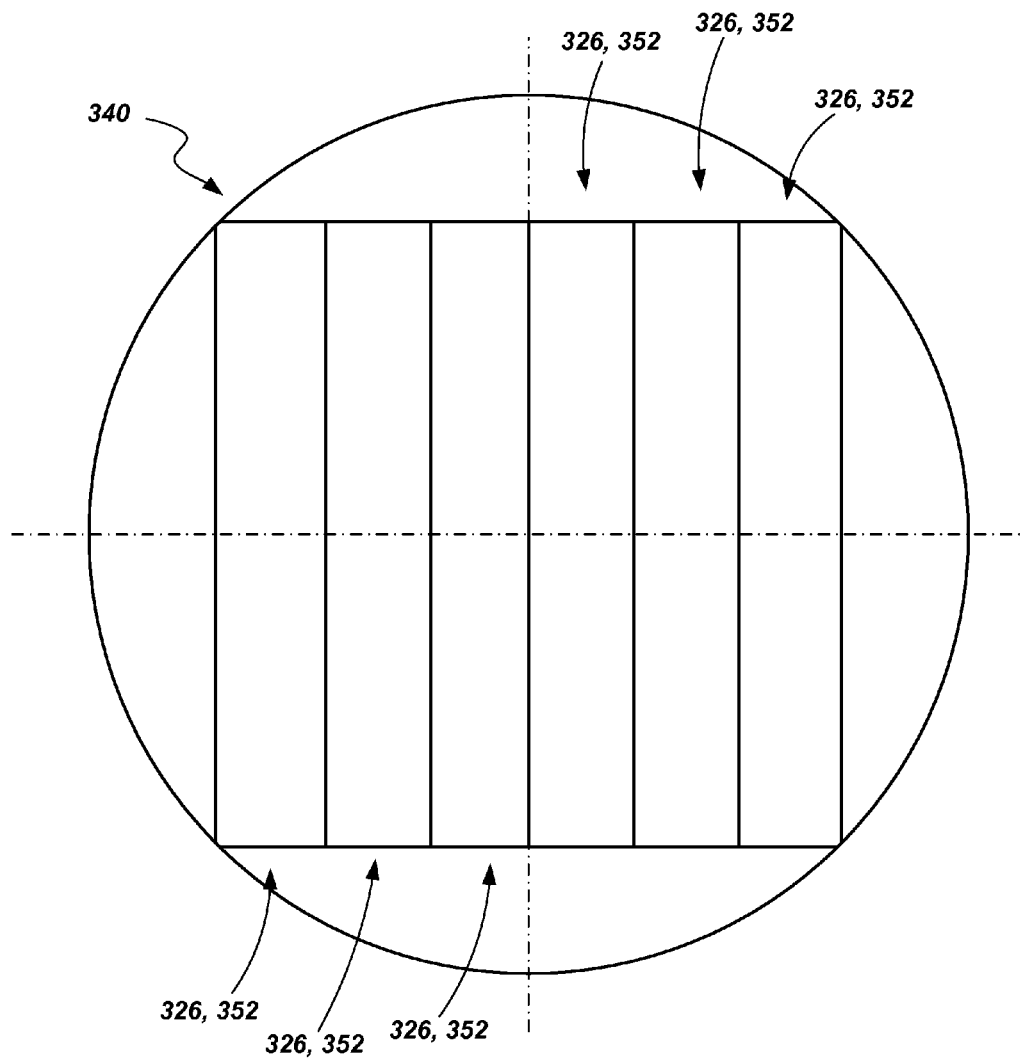
*FIG. 20*

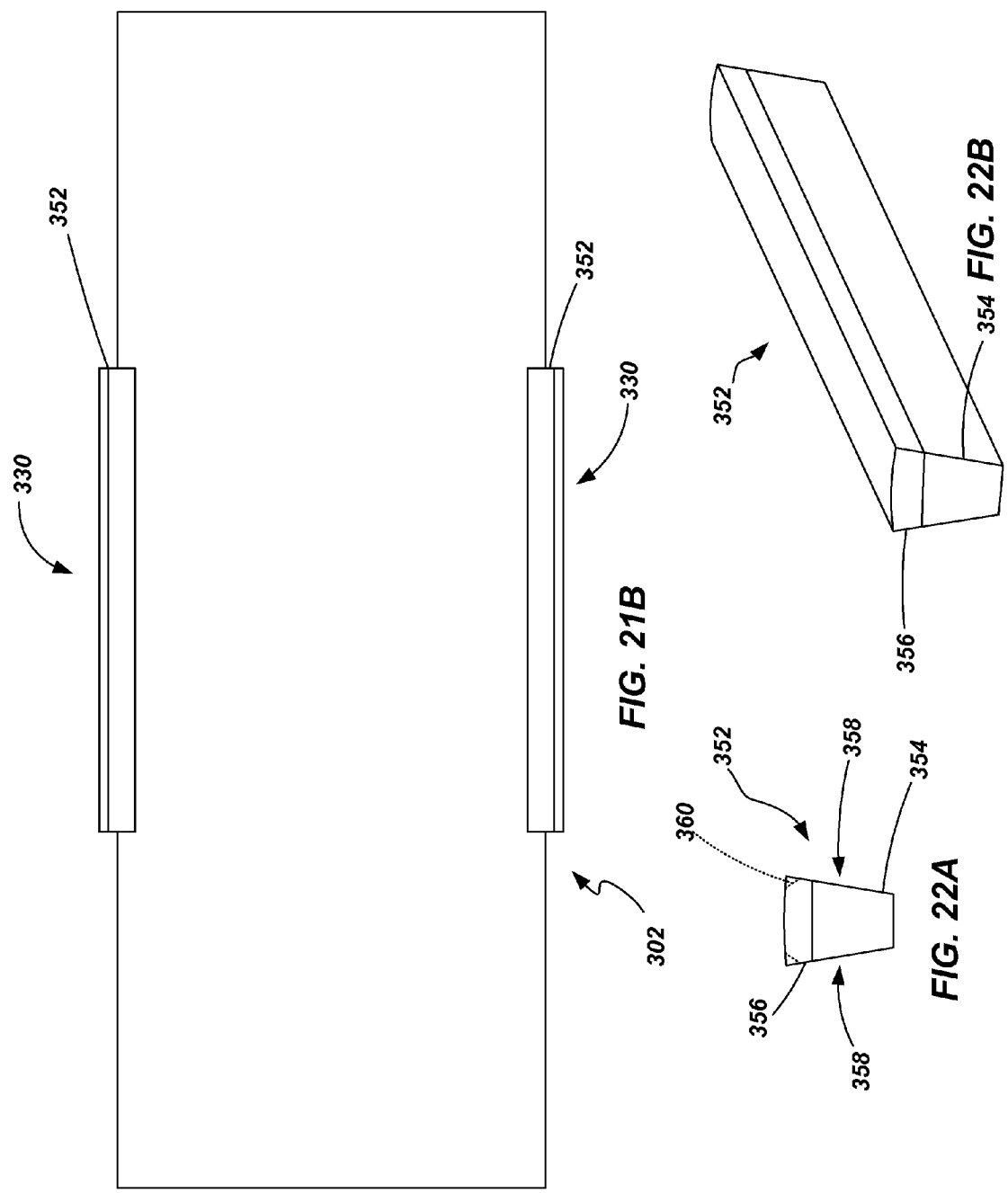

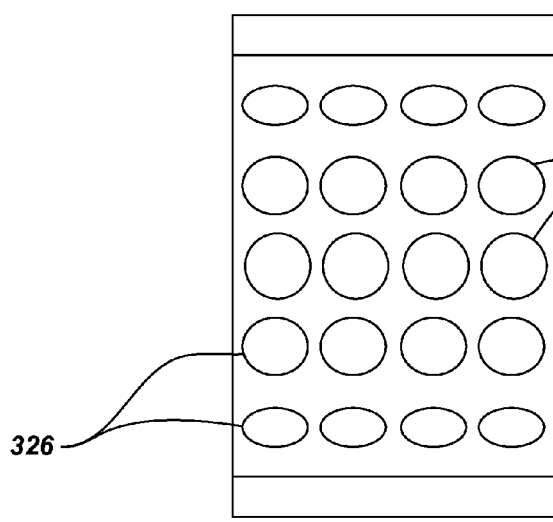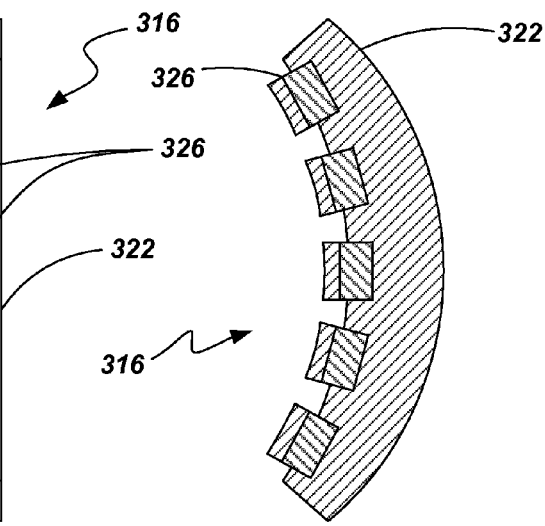
FIG. 23A   FIG. 23B
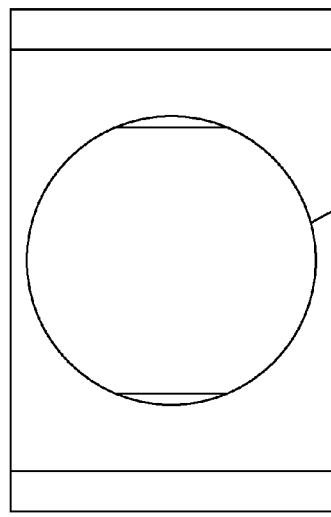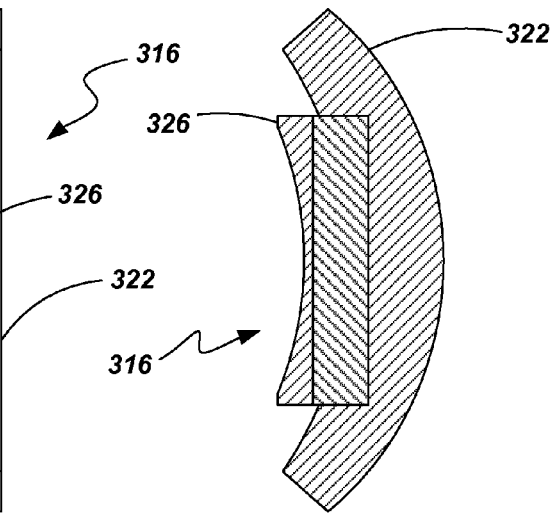
FIG. 24A   FIG. 24B

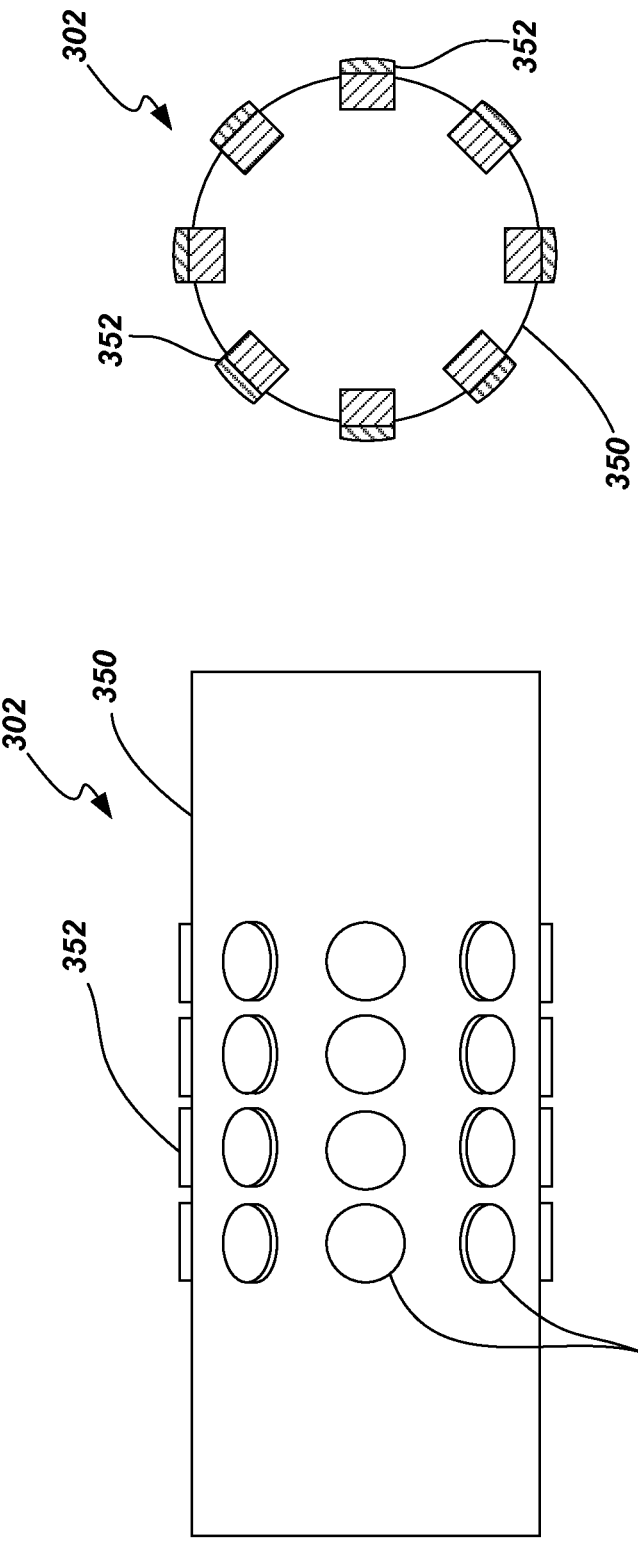

BEARING ELEMENTS, BEARING ASSEMBLIES, AND RELATED METHODS

CROSS-REFERENCE TO RELATED APPLICATIONS

This application is a continuation-in-part of U.S. application Ser. No. 13/089,725 filed on 19 Apr. 2011, the disclosure of which is incorporated herein, in its entirety, by this reference.

TECHNICAL FIELD

Embodiments of the present invention relate generally to bearing elements and bearing assemblies and, more particularly, to compositions, configurations, geometries and methods of manufacturing bearing components and bearing assemblies.

BACKGROUND

Bearings are well known devices that enable relative movement two or more components. A variety of different bearing types are known and utilized on a regular basis. So-called "thrust bearings" and some embodiments of radial bearings conventionally include bearing surfaces that at least partially contact and move or slide relative to one another. Such bearing surfaces are conventionally prone to wear due to their interaction with one another and, as such, are formed from appropriate wear resistant materials. For example, such bearing surfaces may include a superhard material for resisting wear during use of the bearing. In one particular example, at least one or both of the bearing surfaces may be formed of a material comprising diamond (e.g., polycrystalline diamond).

As noted above, bearings may be used in numerous applications. In one example, bearings may be used subterranean drilling equipment. Such equipment may include drilling motors and drill bits having multiple components that move relative to one another, such as roller cones, and may be utilized for drilling boreholes into a subterranean formation, such as for oil or gas exploration. In a conventional downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid, which is commonly known as drilling mud, is circulated through the pipe string and the motor to generate torque within the motor to cause the rotary drill bit to rotate. Bearings are conventionally used to enable efficient relative rotation of the rotary bit and other components of the drill string.

Many types of bearings may be used in such a drill string assembly, including the bearings that may be employed by a rotary drill bit. One particular example includes radial bearings. In one embodiment, an inner and outer race are each provided with a plurality of superhard bearing elements (e.g., polycrystalline diamond elements). The races are positioned adjacent one another so that the bearing surfaces of the bearing elements contact one another during starting and stopping or overload conditions. In fluid bearings, the surfaces of the races do not contact during normal operation but, instead, are separated by a fluid film. As may be appreciated, geometry and configuration of the bearing elements of the races may be an important factor influencing the performance and life of such a bearing structure. Examples of some conventional radial bearing apparatuses are disclosed by U.S. Pat. Nos. 4,662,348, 4,729,440, 4,738,322, 4,756,631, and 4,764,036, the disclosures of each of which are incorporated, in their entireties, by this reference. Another example of a bearing used in drill string assembly includes a thrust bearing. A thrust bearing enables rotation between two adjacent components while also supporting a high level of axial thrust. Some examples of a thrust bearing assemblies are set forth in U.S. Pat. Nos. 7,552,782 and 7,870,913, the disclosures of each of which are incorporated, in their entireties, by this reference.

It is a continued desire within the industry to provide improved bearing elements and apparatuses including such elements.

SUMMARY

Embodiments of the present invention are directed to various bearing elements, bearing assemblies and related methods. In accordance with one embodiment of the invention, a bearing assembly is provided. The bearing assembly includes a first tilting pad bearing assembly comprising a body and plurality of tilting pad bearings. Each tilting pad bearing includes a polycrystalline diamond (PCD) layer attached to a base layer. The plurality of tilting pad bearings being circumferentially spaced about the body defining a first collective bearing surface. The bearing assembly also includes a runner bearing comprising a PCD layer having a plurality of PCD elements coupled to a base layer defining a second collective bearing surface. The first tilting pad bearing assembly and the runner bearing are positioned and configured to move relative to each other with the first collective bearing surface being in contact with the second collective bearing surface.

In one embodiment, each of the plurality PCD elements of the runner bearing is contiguous with an adjacent one of the plurality of PCD elements to define a substantially continuous surface. The PCD elements of the runner bearing may exhibit an annular sector geometry in one embodiment. In another embodiment, at least some of the plurality of PCD elements may include a surface exhibiting a substantially square geometry.

In another embodiment, the plurality of PCD elements of the runner bearing are spaced apart from one another such that there is a gap between adjacent PCD elements. One or more of the PCD elements of the runner bearing may exhibit a substantially cylindrical geometry.

Additionally, in one embodiment, the PCD layer of at least one tilting pad bearing includes a plurality of PCD elements. In such an embodiment, each of the plurality PCD elements of the tilting pad bearing may be positioned to be contiguous or in direct contact with one or more adjacent PCD elements of the tilting pad bearing to define a substantially continuous surface. In another embodiment, the PCD elements may be spaced apart from one another such that there is a gap between adjacent PCD elements. The PCD elements may exhibit a variety of geometries.

In one embodiment, the runner bearing further comprises a second PCD layer comprising another plurality of PCD elements coupled to the base layer defining a third collective bearing surface. Additionally, the bearing assembly may include a second tilting pad bearing assembly having a body and plurality of tilting pad bearings, each tilting pad bearing of the second assembly comprising a polycrystalline diamond (PCD) layer attached to a base layer, the plurality of tilting pad bearings of the second assembly being circumferentially spaced about the body of the second assembly and defining a fourth collective bearing surface. The second tilting pad bearing assembly and the runner bearing may be positioned and configured to move relative to each other with the third collective bearing surface being in contact with the fourth collective bearing surface.

In accordance with another embodiment of the present invention, a bearing element is provided. The bearing element includes a base layer and a polycrystalline diamond (PCD) layer. The PCD layer includes a plurality of PCD elements coupled with the base layer with each PCD element comprising a substrate and a diamond table.

In one particular embodiment, each of the plurality PCD elements is contiguous with an adjacent one of the plurality of PCD elements to define a substantially continuous surface. The substantially continuous surface may exhibit various geometries. For example, in one embodiment the substantially continuous surface is shaped as an annular sector. In another embodiment the substantially continuous surface exhibits a substantially circular geometry.

In another embodiment, the plurality of PCD elements are spaced apart from one another such that there is a gap between adjacent PCD elements.

The PCD elements may also exhibit various geometries. Such geometries may include providing a diamond table surface that is substantially square, rectangular circular or other geometries.

In one embodiment, the base layer of the bearing element may comprise tungsten carbide. In such an embodiment, the substrate may likewise comprise tungsten carbide. In another embodiment, the base layer may comprise steel.

In one embodiment, the bearing element may be formed as a tilting pad bearing element. In such a case, a projection may be formed on the base layer to enable the bearing element to rock relative to other components within a bearing assembly. In another embodiment, when formed as a tilting pad bearing, the base layer may be formed to exhibit an arcuate surface.

In accordance with another embodiment to the present invention, a method is provided for manufacturing a bearing element. The method includes forming at least one polycrystalline diamond compact (PDC) having a diamond table and a substrate under high-pressure, high-temperature conditions. The at least one PDC is attached to a base layer. In one embodiment, forming at least one PDC includes forming a plurality of PDCs and attaching them to the base layer. The method may further include arranging the plurality of PDCs to form a substantially continuous bearing surface. In another embodiment, the method may include spacing the plurality of PDCs from each other such that a gap exists between adjacent PDCs.

Attaching the PDC(s) to the base layer may include a brazing process in one embodiment. In another embodiment, attaching the PDC(s) to the base layer may include an e-beam welding process. In yet another embodiment, attaching the PDC(s) to the base layer may include clamping the PDC(s) using one or more clamps or other fastening mechanisms.

Other features, aspects and embodiments are set forth herein as will become apparent upon review of the detailed description. It is noted that features of one described embodiment herein may be combined with features of other described embodiments without limitation.

BRIEF DESCRIPTION OF THE SEVERAL VIEWS OF THE DRAWINGS

The foregoing and other advantages of embodiments of the invention will become apparent upon reading the following detailed description and upon reference to the drawings in which:

FIGS. 13A-13E show respective side views of various embodiments of bearing elements;

FIGS. 16A-16D show a top and various cross-sectional views, respectively, of bearing components;

FIGS. 19A and 19B show end and perspective views, respectively, of a bearing element;

FIG. 20 shows a plan view of a fabrication component used in forming bearing elements that may be used in the bearing assemblies of the present invention;

FIGS. 21A and 21B show perspective and partial cross-sectional views, respectively, of a component of a bearing assembly;

FIGS. 22A and 22B show end and perspective views, respectively, of a bearing element;

FIGS. 23A and 23B show front and cross-sectional views, respectively, of a component of a bearing assembly;

FIGS. 24A and 24B show front and cross-sectional views, respectively, of a component of a bearing assembly;

FIGS. 25A and 25B show front and cross-sectional views, respectively, of a component of a bearing assembly;

DETAILED DESCRIPTION

Figure 1A:
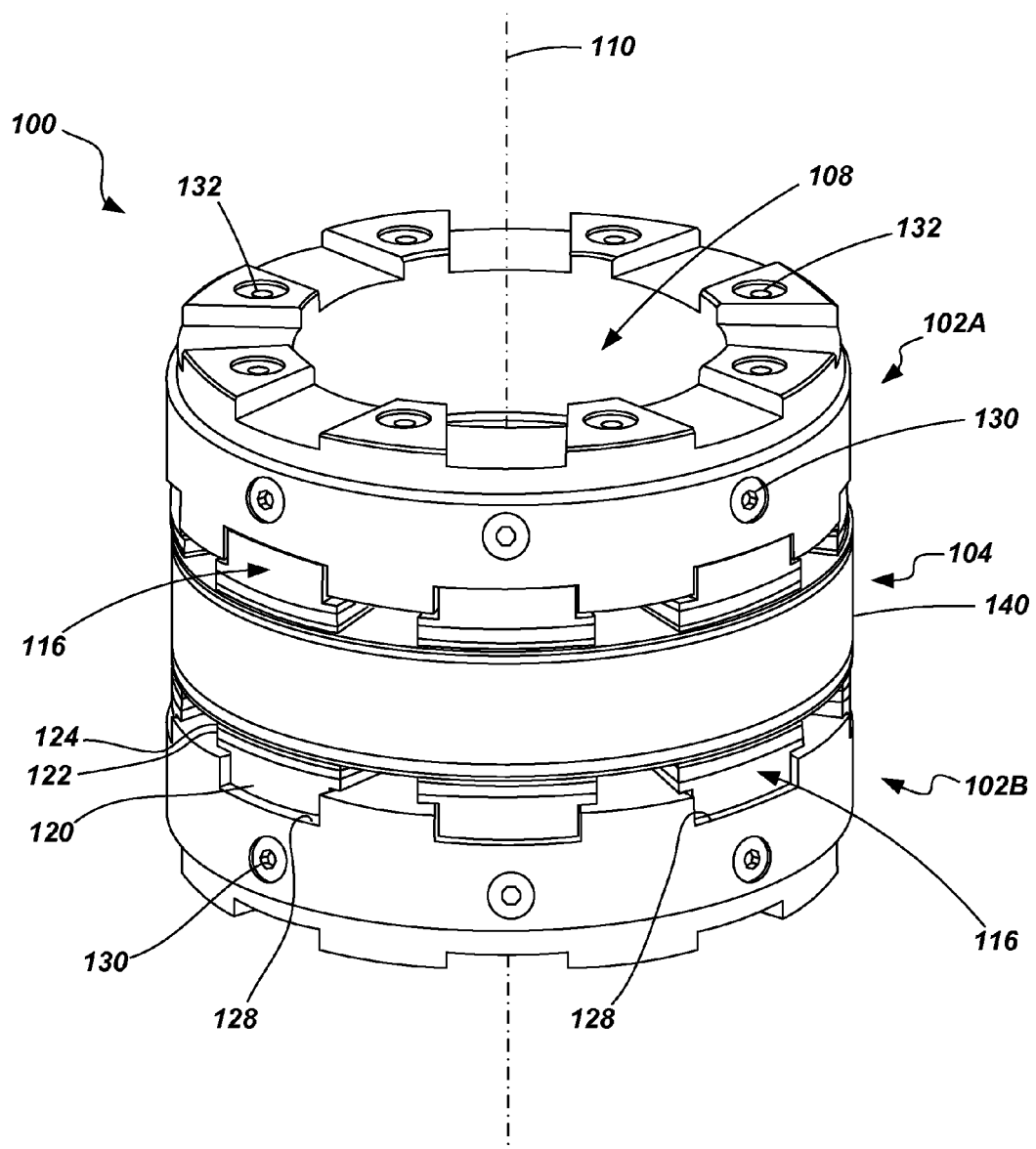
FIG. 1A shows a perspective view of an embodiment of a bearing assembly according to the present invention.

Embodiments of the present invention relates generally to bearing elements and apparatuses that may include bearing surfaces comprising superhard materials. "Superhard," as used herein, refers to any material having a hardness that is at least equal to or exceeds a hardness of tungsten carbide (e.g., without limitation, polycrystalline diamond, boron nitride, silicon carbide, silicon nitride, aluminum nitride, aluminum oxide, titanium diboride, yttrium oxide, boron carbide and mixtures of the foregoing). For example, in one embodiment, a polycrystalline diamond compact (PDC), or multiple PDCs, may be used to form a bearing surface in the bearing elements and apparatuses of the presently disclosed invention. In another embodiment, polycrystalline diamond may include nanodiamond (i.e., ultra-dispersed diamond), if desired. In yet another example, the bearing surface may include a silicon carbide and diamond composite material such as is disclosed in U.S. Pat. No. 7,060,641, the disclosure of which is incorporated herein, in its entirety, by this reference. A variety of other superhard materials may be utilized in forming a superhard bearing in accordance with the presently disclosed invention as will be appreciated by those of ordinary skill in the art.

Considering the example of a PDC, a PDC is conventionally fabricated by placing a cemented carbide substrate into a container or cartridge with a layer of diamond crystals or grains positioned adjacent one surface of a substrate. A number of such cartridges may be typically loaded into an ultra-high pressure press. The substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond with diamond-to-diamond bonds. Additionally, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are some non-limiting examples of solvent catalysts that may be used in forming polycrystalline diamond.

In one configuration, during sintering, the solvent catalyst may include the substrate body (e.g., cobalt from a cobalt-cemented tungsten carbide substrate). In such a case, the solvent catalyst from the substrate becomes liquid and sweeps from the region adjacent to the diamond powder and into the diamond grains. In another embodiment, a solvent catalyst may be mixed with the diamond powder prior to sintering, either in lieu of, or in addition to, the existence of a solvent catalyst in the substrate. Thus, diamond grains become mutually bonded to form a polycrystalline diamond table upon the substrate. A conventional process for forming polycrystalline diamond structures is disclosed in U.S. Pat. No. 3,745,623 to Wentorf, Jr. et al., the disclosure of which is incorporated, in its entirety, by this reference.

The solvent catalyst may remain in the polycrystalline diamond layer within the interstitial pores between the diamond grains or may be at least partially removed to a desired depth, such as by leaching (e.g., exposing at least a portion of the diamond table to an acid) or by any other suitable method. Removal of the catalyst may enhance the thermal stability of the PDC material. Optionally, another material may replace the solvent catalyst that has been at least partially removed from the polycrystalline diamond.

In one embodiment, a bearing apparatus may include polycrystalline diamond (or other superhard) inserts or compacts that define a plurality of bearing surfaces that move relative to one another. Such bearing apparatuses may encompass so-called thrust bearings, radial bearings, or other bearing apparatuses having bearing surfaces that move in relation to one another. Bearing apparatuses described herein may include titling pad bearings. Tilting pad bearings are generally used in high speed machinery operating under medium to high loads (e.g., turbines, pumps, turbocompressors and high speed gearboxes). They offer the optimum solution to any particular requirement because of their utility to automatically adjust to varying conditions. Various bearing element constructions, bearing assemblies and related methods of manufacturing and operating such components are described herein.

Various systems and assemblies using the described bearing apparatuses are contemplated, including, for example, various components associated with drilling strings and down hole drilling tools. For example, a radial bearing according to the present invention may be included within a motor or turbine. Generally, such a downhole drilling motor assembly may be located at the end of a series of pipe sections comprising a drill string. The housing of downhole drilling motor assembly may remain stationary as a rotary drill bit coupled thereto rotates. Thus, an output shaft of a downhole drilling motor assembly may be coupled to a rotary drill bit and drilling fluid (i.e., drilling mud) may cause torque to be applied to the output shaft to cause a rotary drill bit to rotate. Thus, such a downhole drilling motor or turbine assembly may include one or more radial bearing apparatuses. Of course, the bearing components and assemblies described herein are not limited to use in subterranean drilling equipment and applications. Rather, the described components and assemblies may be used in various mechanical systems and applications.

The use of polycrystalline diamond (PCD) in assemblies that include, for example, tilting pad bearings and shaft rotors have several advantages (as compared to conventional tilting pad bearings using babbit or polymer pad surfaces with steel runners). For example, PCD tilting pads and PCD rotors exhibit less wear due to the inherent wear resistance of PCD. Wear in tilting pad bearings normally occurs during starting and stopping of the machine rotating parts. Additionally, a bearing that places one PCD bearing surface against another bearing PCD surface tends to not gall or wipe as typical metal bearing surfaces. Rather, such surfaces tend to polish with the result of improving the bearing surface characteristics. It is also believed that, with an exceptionally high thermal conductivity, PCD bearing pads should also remove more heat from the bearing surface which may, in turn, increase the viscosity of the fluid and increase the film thickness during hydrodynamic operation—an important parameter in tilting pad bearing performance and design. The high thermal conductivity will also remove heat from the contacting surfaces during starting and stopping, which will help to keep the contacting surfaces from overheating. As noted above, and as will be appreciated by those of ordinary skill in the art, bearing surfaces in a tilting pad design may conventionally be separated by a fluid film during normal operation so that surface wear and frictional forces are substantially reduced. Among other things, the fluid film helps to distribute forces among the pads or shoes of the bearing assembly. Additionally, such a bearing configuration provides superior shock absorbing and damping characteristics.

While specific examples of bearing elements, bearing assemblies and manufacturing processes are described herein, a variety of other techniques, features and processes may be utilized in association with the described embodiments. For example, various types of bearing elements are described in U.S. Pat. Nos. 7,635,035, 7,866,418 and 8,146,687, as well as in U.S. patent application Ser. Nos. 11/545,929, 12/495,986, 13/070,636 and 13/087,775, the disclosures of each of which are incorporated by reference herein in their entireties. Additionally, various bearing ring designs and manufacturing processes are described in U.S. Pat. Nos. 7,533,739, 7,901,137 and 7,942,218 as well as in U.S. patent application Ser. Nos. 12/425,304 and 12/761,535, the disclosures of each of which are incorporated by reference herein in their entireties.

Figure 1B:
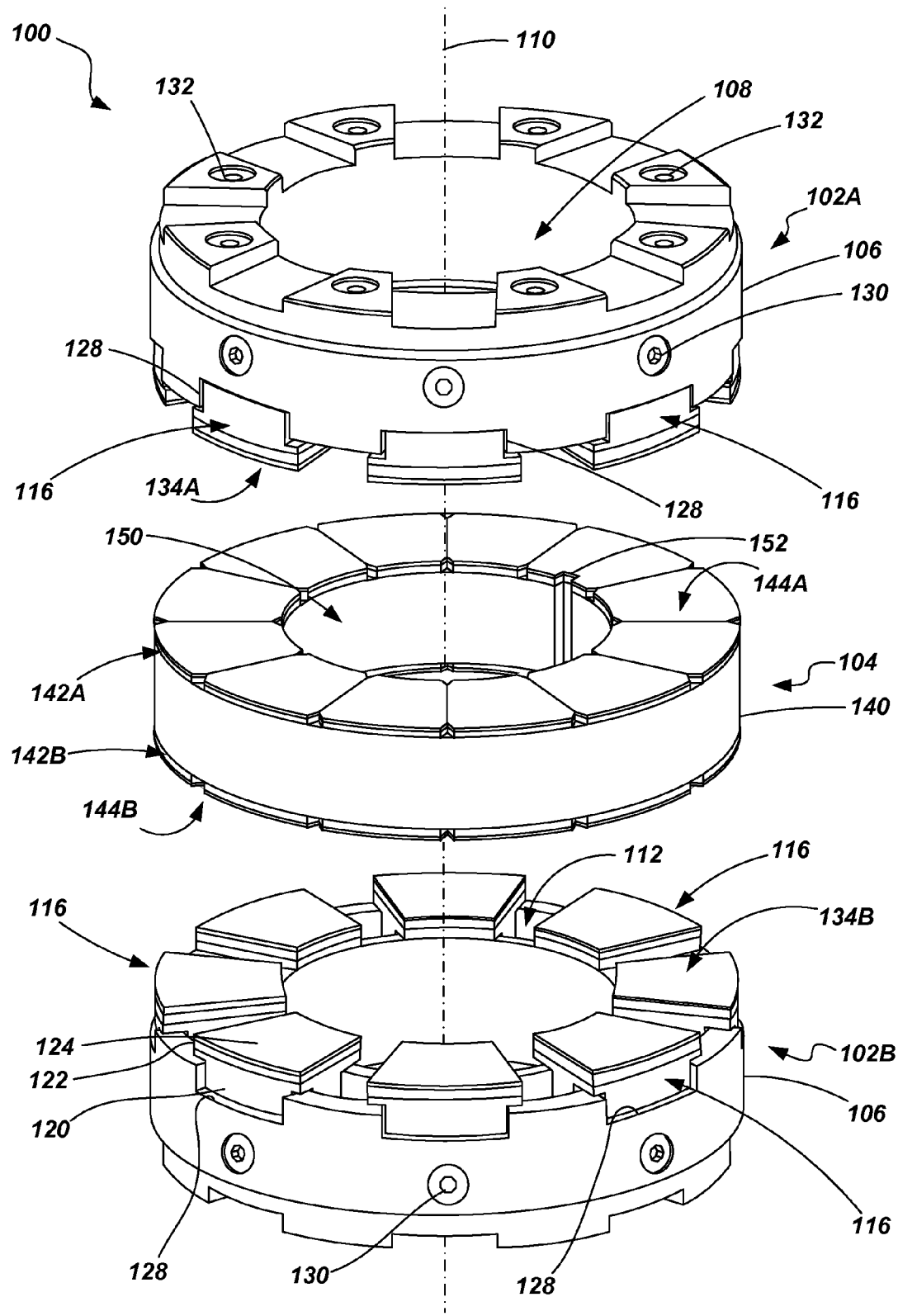
FIG. 1B shows an exploded view of the assembly shown in FIG. 1A.
Figure 1C:
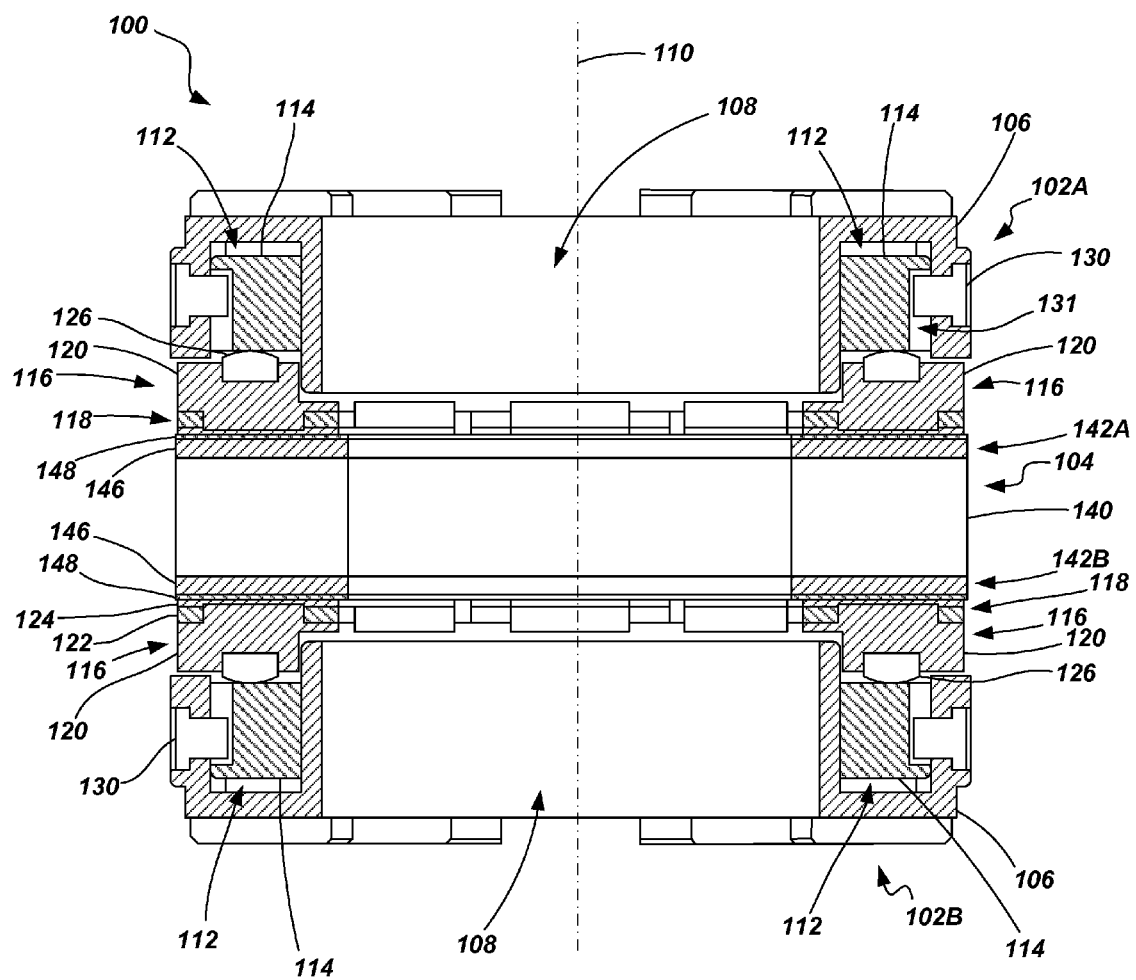
FIG. 1C shows a partial cross-sectional view of the assembly shown in FIG. 1A.

Referring to FIGS. 1A-1C, various views are shown of a bearing assembly 100 in accordance with an embodiment of the present invention. In the presently described embodiment, the bearing assembly 100 is configured as a thrust bearing. However, as will become apparent below, various features and aspects of the present invention are applicable to a number of other types of bearings as well.

The bearing assembly 100 includes a pair of tilting pad assemblies 102A and 102B with a bearing runner 104 disposed therebetween. While the tilting pad assemblies 102A and 102B may be configured differently from each other, in the present embodiment they are configured to be substantially identical to one another. As such, similar (although, perhaps not identical) components in the tilting pad assemblies 102A and 102B will be identified with common references numerals.

The tilting pad assemblies 102A and 102B each include a body 106 configured in a generally ring-shaped or toroid-shaped configuration and may define an aperture 108 which may be generally centered about a longitudinal axis 110. An annulus 112 or an annular channel may be formed in the body 106 to house some of the components of the pad assembly 102. For example, a plurality of components that form a leveling mechanism 114 as will be described in further detail below. A plurality of individual bearing elements, also referred to as tilting bearing pads 116 (or tilting shoes), are positioned above the leveling mechanism and may be partially disposed in the annulus 112 of the body 106.

Figure 2A:
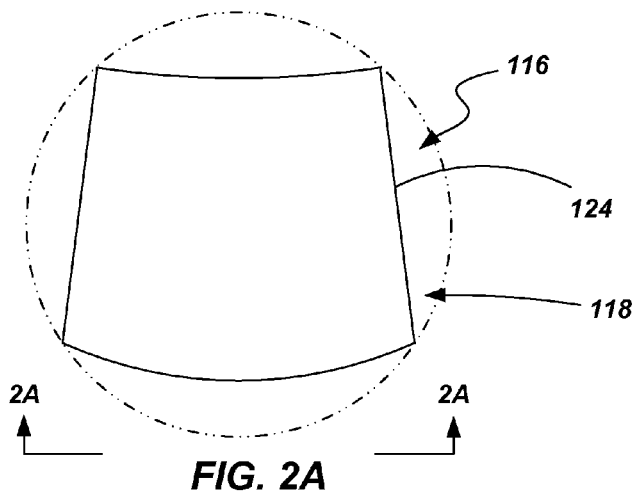
FIG. 2A shows a top view and FIGS. 2B and 2C show respective side views of embodiments of bearing elements that may be used in a bearing assembly such as shown in FIGS. 1A-1C.
Figure 2B:
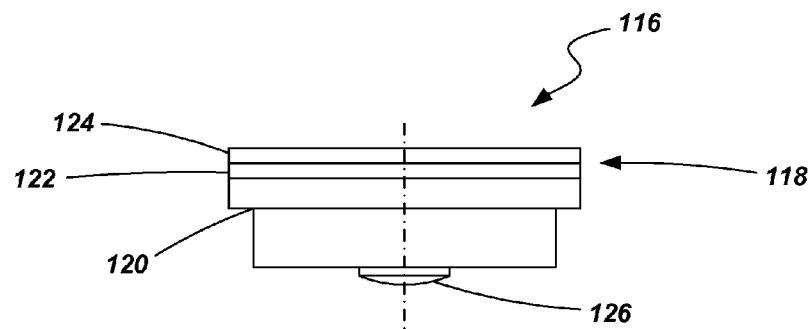

Referring to FIGS. 2A and 2B in conjunction with FIGS. 1A-1C, each tilting bearing pad 116 may be formed to include one or more polycrystalline diamond (PCD) layers 118 formed on a base layer 120. The PCD layer 118 may include a substrate 122 and a diamond table 124 and may be formed, for example, using high-temperature, high-pressure sintering processes such as set forth above. In one particular embodiment, the substrate 122 may comprise tungsten carbide, although other materials may be utilized. In other embodiments, the substrate 122 may be optionally omitted. The base layer 120 of the tilting bearing pad 116 may be formed of a variety of materials including, for example various metals, metal alloys or carbide materials. In one example, the base layer 120 may comprise a steel material. In another example, the base layer 120 may comprise a tungsten carbide material (e.g., a cemented tungsten carbide material, such as, for example, cobalt-cements tungsten carbide). The use of a tungsten carbide material to form both the base layer 120 and the substrate of the PCD layer 118 may help to reduce or eliminate residual stresses in the tilting pad bearing pad 116 after fabrication due to fact that such components would exhibit suitably similar rates of thermal expansion. In other embodiments, as will be described below, a material with a relatively higher rate of thermal expansion may be used for the base layer 120 in order to correct or take advantage of any warping tin the PCD layer 118 during brazing.

In one embodiment, the PCD layer 118 may be formed as a PCD compact (e.g., a 19 millimeter or a 13 millimeter diameter PCD compact) that is shaped, such as by machining or otherwise shaping the sides (e.g., grinding or wire electro discharge machining), to a desired geometry. For example, a conventional round-shaped PCD compact (represented by dashed lines in FIG. 2A) may cut or machined to exhibit a substantially wedge- or annular sector-shaped geometry as shown in FIG. 2A).

Figure 2C:
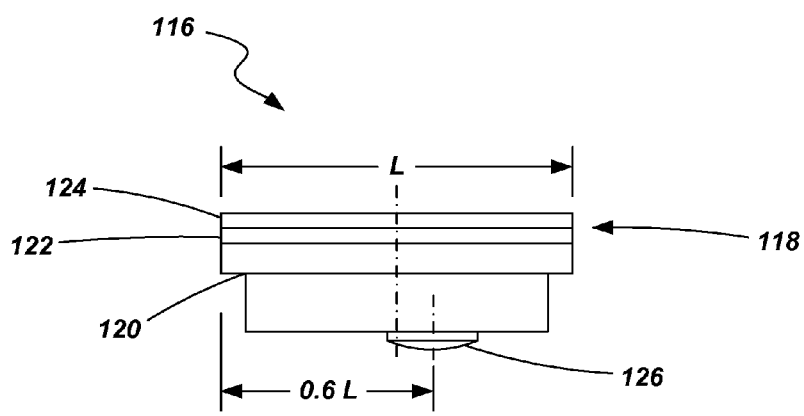

The tilting pad bearings 116 also include a protrusion or button 126 along a portion of the base layer 120. The button 126 engages a portion of the leveling mechanism 114 and enables the tilting pad bearing 116 to tilt, pivot or rock relative to the leveling mechanism 114 as well as the body 106 within a defined range of motion. For example, as seen in FIG. 1C, the button 126 may be configured to abut a portion of the leveling mechanism 114 such that there is a gap or a space between the base layer 120 of the tilting pad bearing 116 and the adjacent components of the leveling mechanism 114 (as well as between the base layer 120 of the tilting pad bearing 116 and adjacent portions of the body 106) so that the tilting pad bearing 116 can rock relative to such components. In one example, such as illustrated by FIG. 2B, the button 126 is substantially centered relative to the radial edges of the titling pad bearing 116. However, in other embodiments, such as shown in FIG. 2C, the button 126 may be slightly off center relative to the radial edges of the tilting pad bearing 116. In one particular embodiment, the center of the button 126 may be placed at a location that is approximately 60% of circumferential distance away from the leading edge of the tilting pad bearing 116 (the circumferential distance being shown as length L extending from one radial edge to the other radial edge). The button 126 may also be centered between inner and outer circumferential edges, or it may be displaced toward one of the circumferential edges if desired.

Figure 3A:
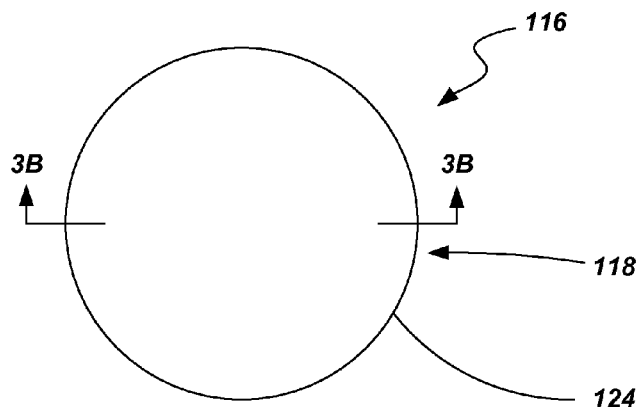
FIG. 3A shows a top view and FIGS. 3B and 3C show respective side views of further embodiments of bearing elements that may be used in a bearing assembly such as shown in FIGS. 1A-1C.
Figure 3B:
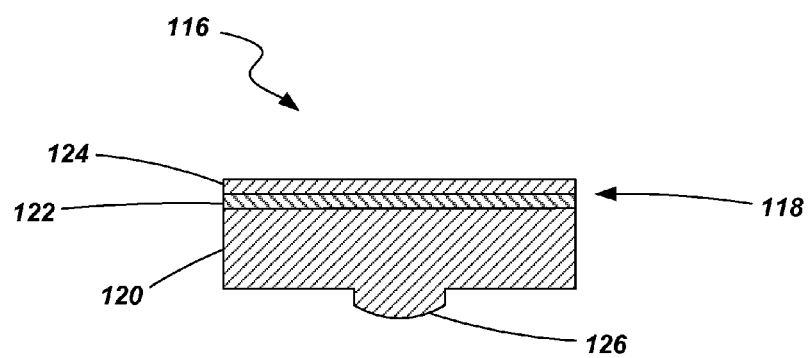

Referring to FIGS. 3A and 3B, another embodiment of a tilting pad bearing 116 is illustrated. As with the embodiments described with respect to FIGS. 2A-2C, each tilting bearing pad 116 may be formed to include one or more polycrystalline diamond (PCD) layers 118 formed on a base layer 120. The PCD layer 118 may include a substrate 122 and a diamond table 124 and may be formed, for example, using high-temperature, high-pressure sintering processes such as set forth above. In one particular embodiment, the substrate 122 may comprise tungsten carbide, although other materials may be utilized. In other embodiments, the substrate 122 may be optionally omitted or the substrate 122 may form the portion shown as base layer 120 (i.e., base layer 120 may be optionally omitted). The base layer 120 of the tilting bearing pad 116 may be formed of a variety of materials including, for example various metals, metal alloys or carbide materials. In one example, the base layer 120 may comprise a steel material. In another example, the base layer 120 may comprise a tungsten carbide material (e.g., a cemented tungsten carbide material, such as, for example, cobalt-cemented tungsten carbide). The tilting pad 116 bearing may be formed from substantially similar materials, and using substantially similar processes, as those described with respect to other embodiments described above. However, it is noted that the tilting pad 116 exhibits a substantially cylindrical geometry rather than being shaped like some other embodiments described herein. Thus, the tilting pad 116 may be formed from, for example, a conventional PCD compact, such as a 13 mm or a 19 mm diameter compact. Of course, the tilting pad 116 may exhibit other sizes, or may be cut from a tool blank or otherwise formed if desired.

Figure 3C:
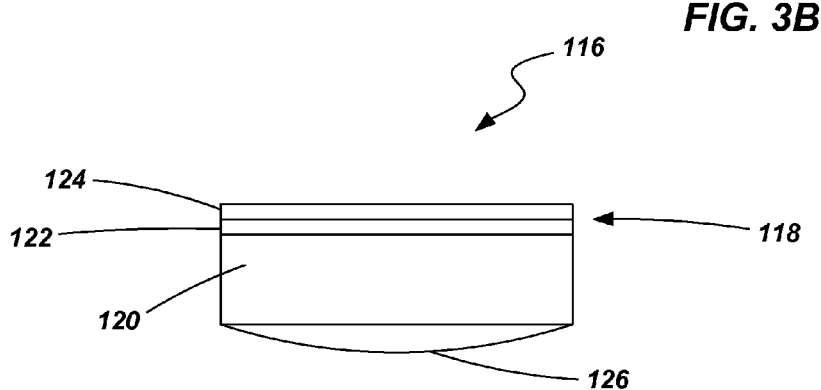

The tilting pad bearings 116 may also include a protrusion or button 126 along a portion of the base layer 120. As shown in FIG. 3B, the button 126 may be integrally formed with, for example, the base layer 120. In other embodiments, the button 126 may be a separate component adhered, coupled or affixed to, for example, the base layer 120. As seen in FIG. 3C, in another embodiment, a lower surface of the base layer 120 may be rounded to exhibit a substantially spherical (or a portion of a sphere) to act as the button 126.

Figure 4:
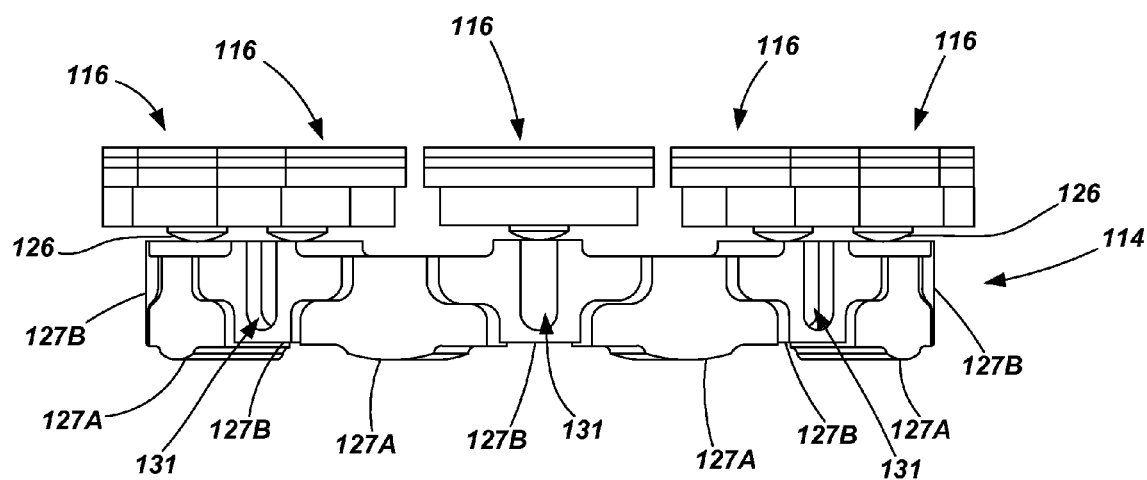
FIG. 4 shows a side view of certain components of the bearing assembly shown in FIGS. 1A-1C.

Referring briefly to FIG. 4, an example is shown of the tilting pad bearings 116 disposed on components of the leveling mechanism 114 with the body 106 and other components of the tilting pad bearing assembly 102A (or 102B) being absent in order to provide a better view of the leveling mechanism 114. The leveling mechanism 114 includes a plurality of lower components 127A and a plurality of upper components 127B that engage one another in a generally conformal or mating relationship, with upper and lower components alternating as they circumferentially extend about the annulus 112 in which they are disposed (see e.g., FIG. 1C). It is noted that the terms "upper" and "lower" are used for convenience and are used as relative terms with respect to the view shown in FIG. 4. The buttons 126 of the tilting pad bearings 116 each rest on a corresponding upper component 127B and may tilt or rock relative thereto. In some embodiments, the leveling mechanism 114 may be omitted.

Referring back to FIGS. 1A-1C, the body 106 may be configured to limit the movement of the tilting pad bearings 116 in various directions (within defined limits or tolerances) relative to the body 106. For example, notches or recesses 128 may be formed in the body 106 to engage shoulder portions or other surfaces of the tilting pad bearings 116. The recesses 128 help to maintain the titling bearing pads 116 at a desired position relative to the body 106 and limit the titling pad bearings 116 from moving in a circumferential direction relative to the body 106 during operation of the assembly 100.

When assembled, retaining devices 130 such as fasteners (or other structures or mechanisms) may be associated with the body 106 to engage a portion of the leveling mechanism 114 (e.g., a slot 131 or other feature in, for example, the upper components 127B) to retain the leveling mechanism in a desired position (within desired tolerances or specifications) within the annulus 112 (e.g., see FIG. 1C). Another plurality of retaining devices 132 such as fasteners (or other structures or mechanisms) may also be associated with the body 106. In one embodiment, the retaining devices 132 include fasteners located along a face that is generally opposite the face where the tilting pad bearings 116 are located. Each retaining device 132 may engage a portion of the leveling mechanism 114 (e.g., a lower component 127A) to prevent the leveling mechanism 114 from moving in the circumferential direction, or at least limit its circumferential movement within desired tolerances or specifications. The use of a leveling mechanism 114 may help compensate for differences in manufacturing tolerances of the numerous components that make up the bearing assembly 100.

Still referring to FIGS. 1A-1C, the runner 104 of the bearing assembly includes a base layer 140, a first PCD layer 142A on the base layer forming a first bearing face 144A, and a second PCD layer 142B on the base layer 140 forming a second bearing face 144B or surface, the two bearing faces being on opposite sides of the base layer 140. Each of the PCD layers 142A and 142B may include a substrate 146 and a diamond table 148 and may be formed, for example, using high-temperature, high-pressure sintering processes. In one particular embodiment, the substrate 146 may comprise tungsten carbide, although other materials may be utilized. The base layer 140 of the runner 104 may be formed of a variety of materials including, for example various metals, metal alloys or carbide materials. In one example, the base layer 140 may comprise a steel material. In another example, the base layer 140 may comprise a tungsten carbide material.

As perhaps best seen in FIG. 1B, the runner 104 may be configured as a substantially annular or ring shaped body defining an opening 150 which may be generally centered about a longitudinal axis 110. A recess 152 may be formed, for example, in an inner surface of the runner that defines the opening 150. The recess 152 may be configured as a keyway to enable coupling of the runner 104 to a shaft (not shown) or other structure extending through the various openings 108 and 150. The coupling of the runner 104 with a shaft or other structure will help enable relative rotation of the runner 104 and the tilting bearing pad assemblies 102A and 102B.

The runner 104 is disposed between the tilting pad assemblies 102A and 102B such that the first bearing face 144A engages the collective bearing surface 134A of one tilting pad bearing assembly 102A and the second bearing face 144B engages the collective bearing surface 134B of the other tilting pad bearing assembly 102B. As noted above, the bearing assembly 100 is configured so that a shaft may pass through the openings and, for example, be coupled with the runner 104 and be rotated about the longitudinal axis relative to the tilting pad bearing assemblies 102A and 102B. In this configuration, the runner 104 may be considered a rotor while the tilting pad assemblies 102A and 102B may remain in a substantially fixed position relative to the runner 104 and be considered to be stators. In other embodiments, the runner 104 may be configured as a stator while the tilting bearing pad assemblies 102A and 102B may be configured as rotors. Other potential embodiments are also considered, including any or all of tilting bearing pad assemblies 102A and 102B and the runner 104 being configured to rotate, but at different rotational rates, or in different directions, relative to adjacent components or assemblies.

It is noted that implementing PCD materials into tilting pad geometries pose various challenges. For example, forming relatively large bearing surfaces (e.g., the bearing surface of a tilting pad bearing 116 or the bearing face 144A of a runner 104) can be challenging due to conventional PCD manufacturing processes. For example, a tilting pad bearing 116 may be sized to be less than an inch in length and/or width in one embodiment and may be as large as a few feet in length and/or width in another embodiment. If the titling pad bearing 116 is to exhibit a bearing surface that is substantially similar to the size of a conventional PCD compact, then a single PCD compact may be used to form the bearing pad 116. However, when the tilting pad bearing 116, or the bearing face of the runner 104, is larger than a conventional PCD compact, then other approaches need to be utilized.

Figure 5A:
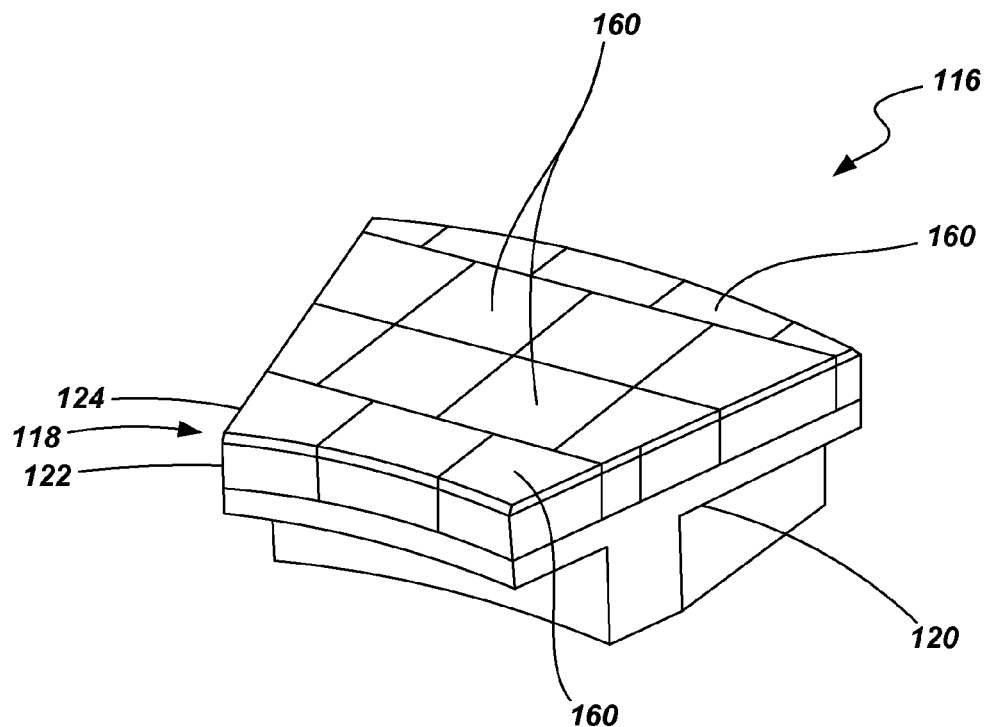
FIGS. 5A and 5B show perspective views of different embodiments of bearing elements that may be used in various bearing assemblies of the present invention.

Referring briefly to FIG. 5A, a tilting pad bearing 116 is shown in accordance with one embodiment of the present invention. The tilting pad bearing 116 includes a PCD material layer 118 and a base layer 120. The PCD layer 118 includes a PCD table 124 formed on a substrate 122 such as described above. The PCD layer 118 is formed from a plurality of individual PCD compacts that have been cut or formed into a desired shaped segments (e.g., square or rectangular) and placed together to form the PCD layer 118. For example, in an assembly 100 that exhibits an outer diameter of roughly 11 inches, the surface of the tilting bearing pad 116 may be 2 inches in length and in width or greater. Thus, several PCD compacts (PDCs) exhibiting, for example, a ¾ inch diameter may be cut (e.g., using a laser or an electro discharge machine (EDM) process) into individual squares, rectangles or other desired shapes 160. The cut shapes 160 may then be fitted together on the base layer 120 and bonded therewith.

Figure 5B:
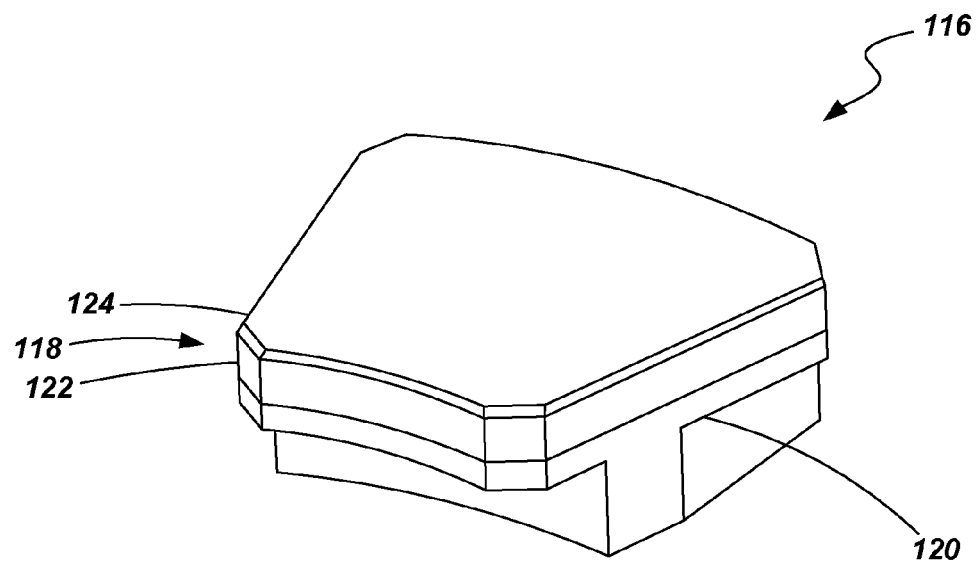

In another embodiment, referring to FIG. 5B, the PCD layer 118 may be formed as a single, integral component. For example, the PCD layer 118 may be cut from a PCD cutting-tool blank that exhibits a sufficiently large size. In one example, a PCD cutting-tool blank having a diameter of approximately 2 to 3 inches may be cut (e.g., using laser, grinding, and/or EDM processes) to the desired shape of the tilting pad bearing 116.

It is noted that the tilting pad bearings 116 shown in FIGS. 5A and 5B (as well as in FIGS. 1A-1C) are shown to include a bearing surface that may be generally described as being an annular sector (i.e., a circumferential portion of a ring), having an inner radius and an outer radius that are connected by two spaced-apart, radially extending edges. As seen in FIG. 5B, the corners joining the various sides may be rounded or clipped. Additionally, as seen in FIGS. 5A and 5B, the peripheral edge of the upper surface may exhibit a chamfer or a radius if desired to prevent a sharp edge from potentially chipping or breaking as it engages other surfaces during operation of the bearing assembly 100. However, such a configuration for the tilting pad bearings 116 is merely an example and should not be considered limiting. Other shapes and configurations are also contemplated. For example, in another embodiment, the bearing surface presented by the tilting pad bearing 116 may be substantially circular rather than an annular sector. Such a configuration, depending on the size of the tilting pad bearing 116, may be more amenable to using PCD compacts (or PCD cutting-tool blanks) and may result in less waste since less (or perhaps none) of the PCD compact will have to be trimmed before or after attaching it to the base layer 120 of the tilting pad bearing 116.

Figure 6A:
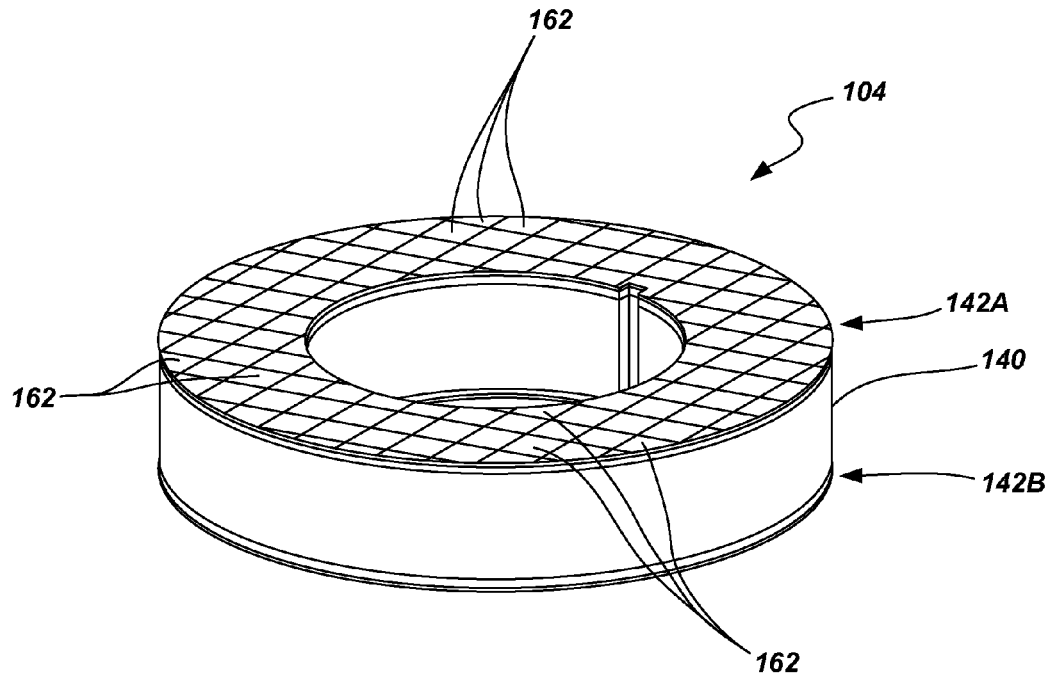
FIGS. 6A and 6B show perspective views of different embodiments of another bearing component of the bearing assembly shown in FIGS. 1A-1C.
Figure 6B:
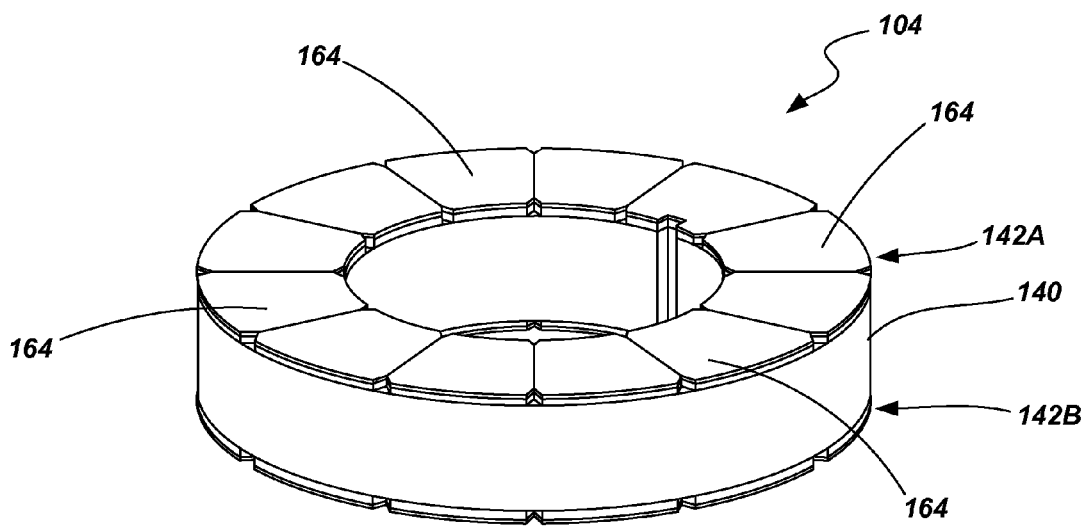

Referring to FIG. 6A, a runner 104 is shown in accordance with an embodiment of the present invention. The PCD layers 142A and 142B of the runner 104 may be configured of a plurality of cut shapes 162, such as squares, rectangles or other shapes (or combinations thereof) formed from individual PCD compacts, similar to the PCD layer 118 of the tilting pad bearing 116 described with respect to FIG. 5A above. In another embodiment, as seen in FIG. 6B, PCD layers 142A and 142B of the runner 104 may be configured of a plurality of annular sector shapes 164, similar to the PCD layers 118 of the tilting pad bearing 116 described with respect to FIG. 5B above. Indeed, in one embodiment, the annular sector shapes 164 may be manufactured to be substantially identical to the PCD layers 118 of the tilting pad bearings 116, which may reduce manufacturing costs and complexities.

Figure 7A:
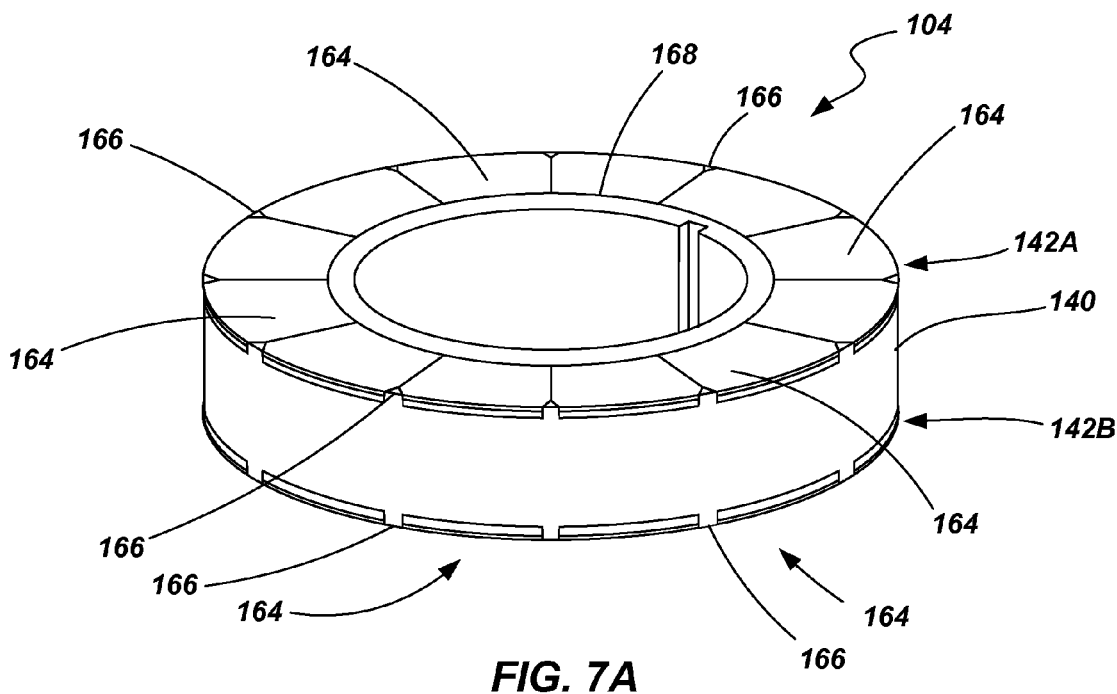
FIGS. 7A and 7B show a perspective views of bearing components according to other embodiments.
Figure 7B:
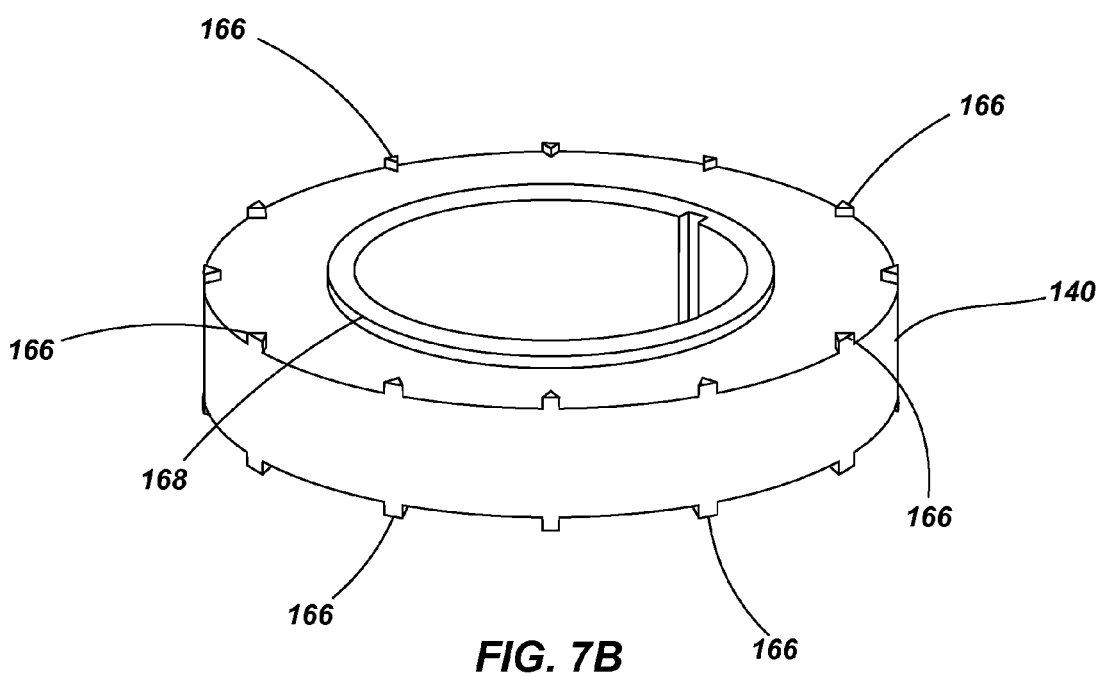

Referring to FIGS. 7A and 7B, a runner 104 and a base layer for the runner 104 are shown, respectively, in accordance with another embodiment of the present invention. The PCD layers 142A and 142B of the runner 104 may be configured of a plurality of annular sector shapes 164, as with the embodiment illustrated in FIG. 6B. The base layer 140 may include a plurality of alignment features 168 circumferentially spaced along each axial face of the runner so as to sit between and circumferentially align adjacent annular sector shapes 164 of the PCD layers 142A and 142B. Additionally, the base layer may include shouldered portion 168 on each face (only one shown in FIGS. 7A and 7B) about the radially inner periphery to abut and radially align the annular sector shapes 164 of the PCD layers 142A and 142B. Of course other features and techniques may be used to align the various components and such alignment features 166 and 168 are merely examples that may be used in various embodiments. In the embodiments described with respect to FIGS. 6A, 6B, 7A and 7B, the PCD layers 142A and 142B may be attached to the base layer 140 substantially simultaneously using, for example, a brazing process. In other embodiments, each layer may be attached to the base layer in an independent process.

Figure 8A:
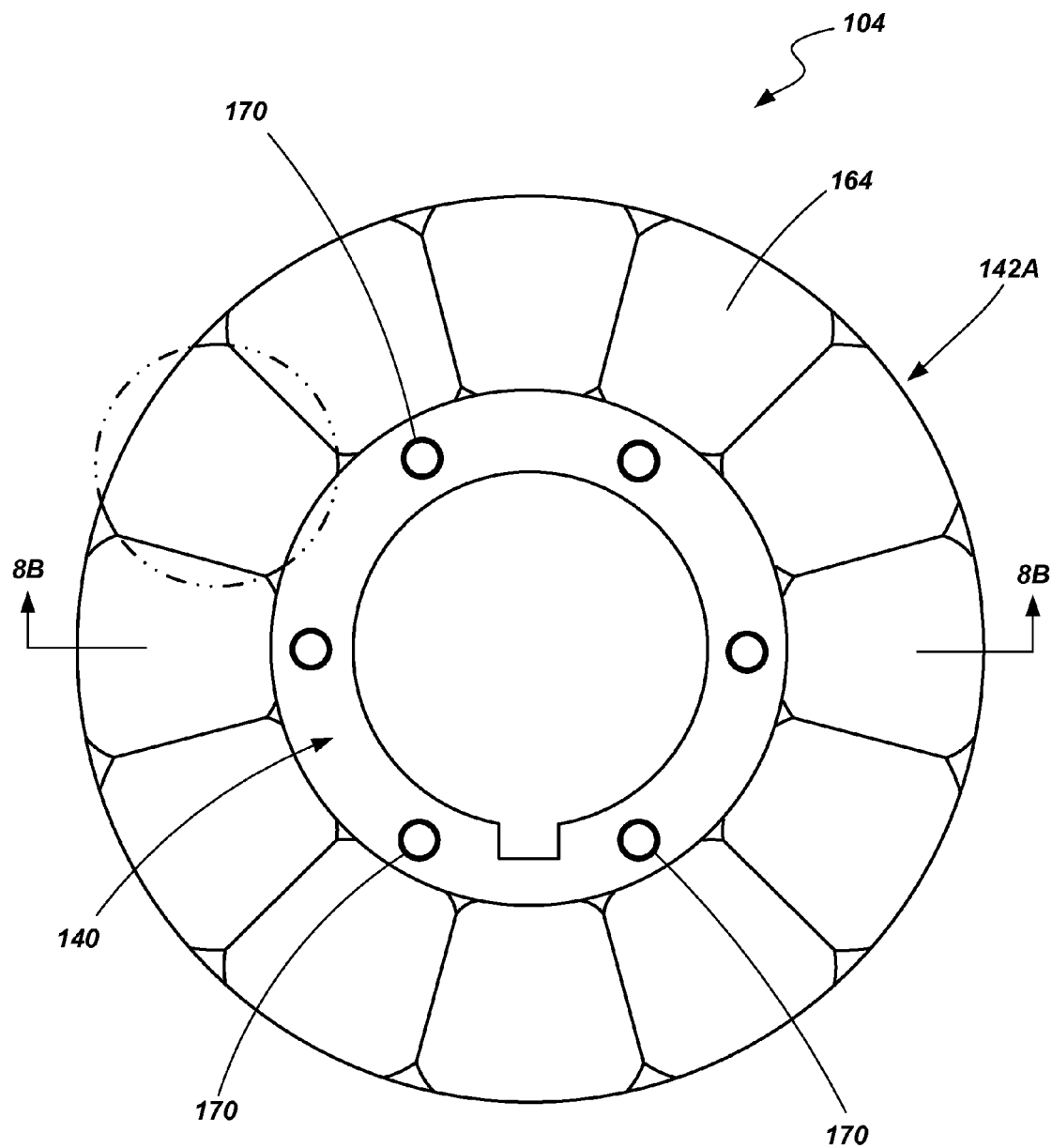
FIGS. 8A and 8B show respective top and cross-sectional views of a bearing component according to another embodiment.
Figure 8B:
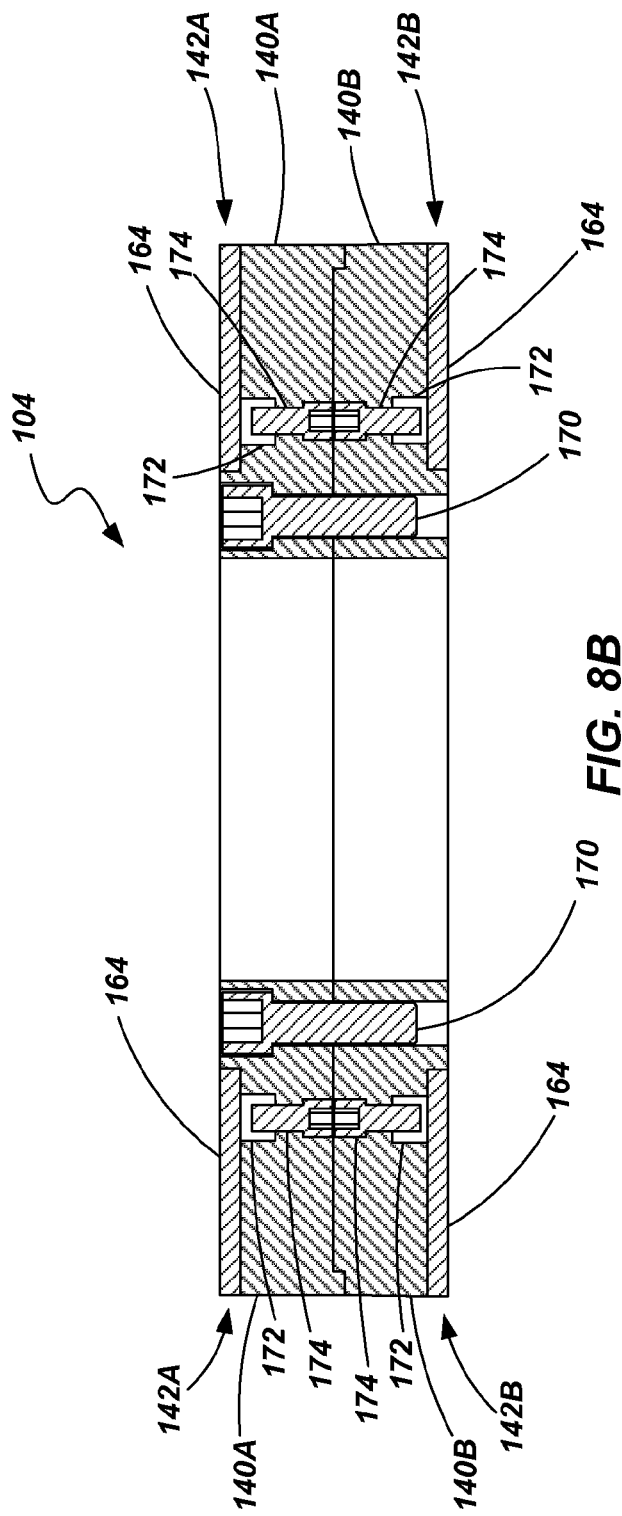

Referring to FIGS. 8A and 8B, another embodiment of a runner 104 is illustrated. As with previously described embodiments, the PCD layers 142A and 142B of the runner 104 may be configured of a plurality of individual PCD components (showing, again, an annular sector 164 that may be formed from a conventional PCD compact or from a tooling blank—represented in dashed lines). While FIGS. 8A and 8B depict the PCD layers 142A and 142B as being formed using annular sectors 164, other shapes may also be utilized such as described above. The base layer of the runner 104 may be formed from multiple components including, for example, a first base component 140A associated with the first PCD layer 142A and a second base component 140B associated with the second PCD layer 142B. The base components 140A and 140B may be coupled to one another, for example, by way of a plurality of fasteners 170. The base components may be keyed or otherwise cooperatively shaped to ensure alignment with one another upon assembly. In another embodiment, the final shaping and finishing of the runner 104 may be accomplished after the assembly of the various components.

Figure 8C:
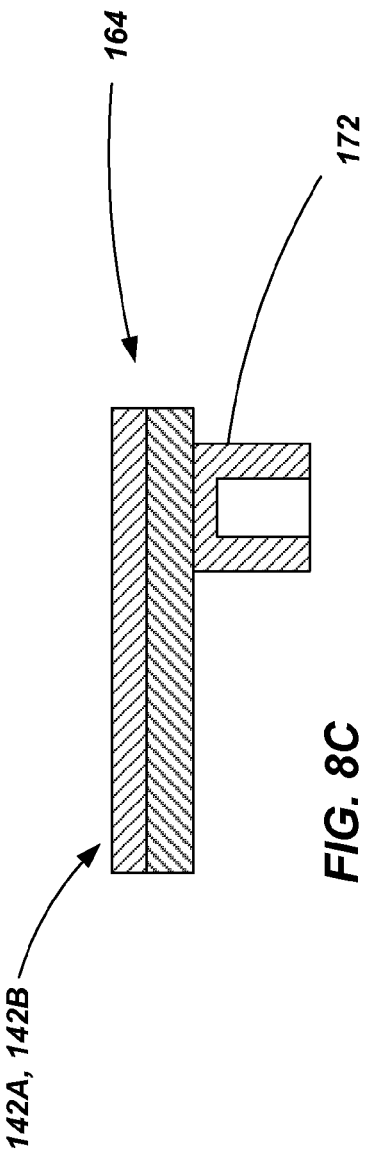
FIG. 8C is an enlarged, cross-sectional view a PCD component.
Figure 9A:
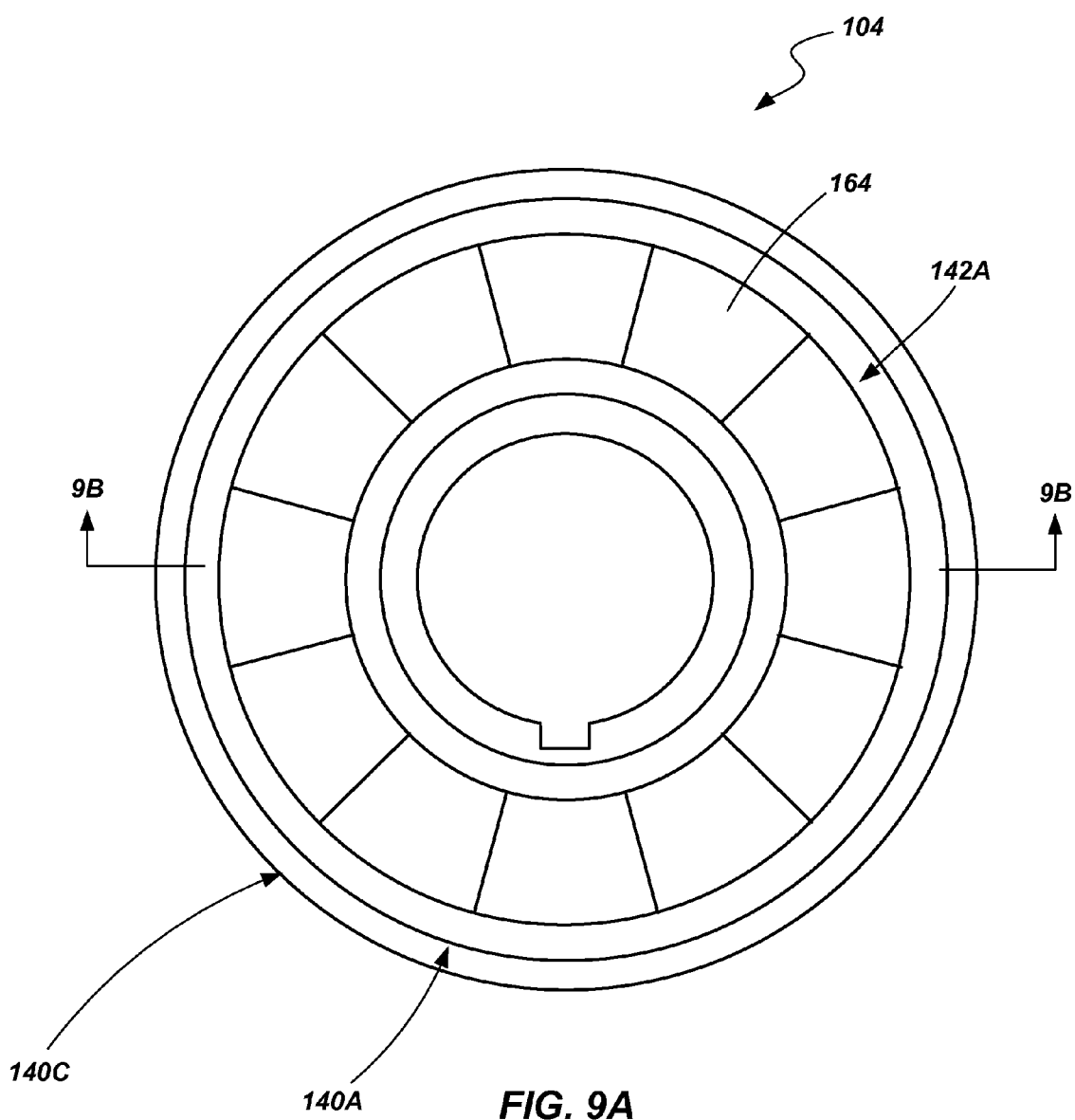
FIG. 9A shows a top view and FIGS. 9B-9D show respective cross-sectional views of a bearing component according to a further embodiment.
Figure 9B:
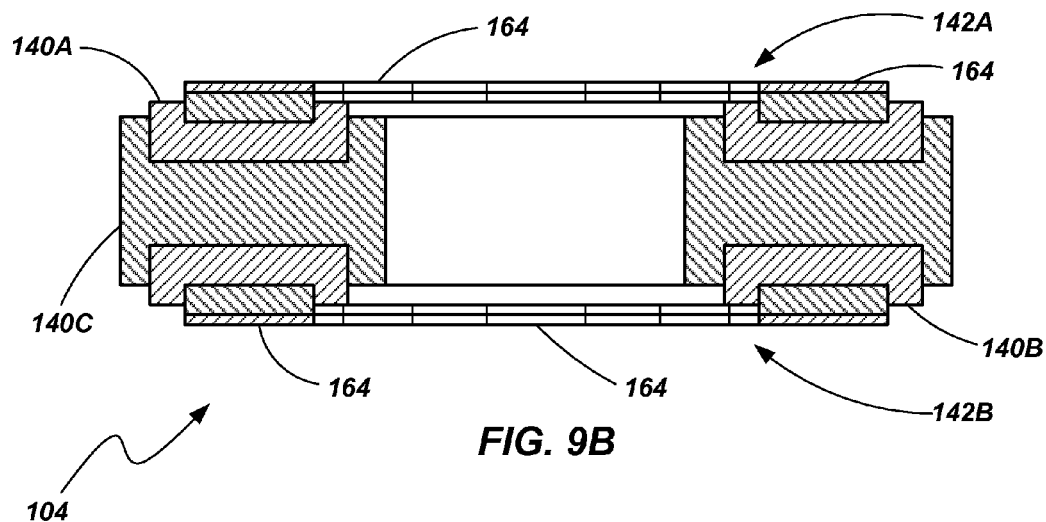
Figure 9C:
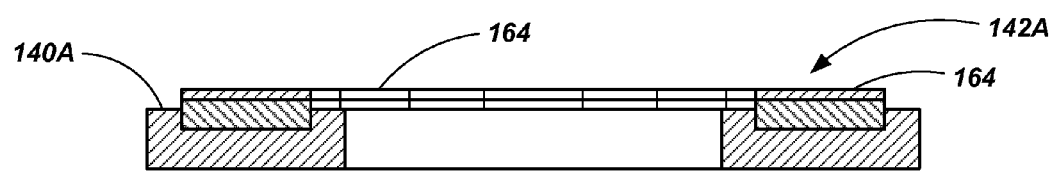
Figure 9D:
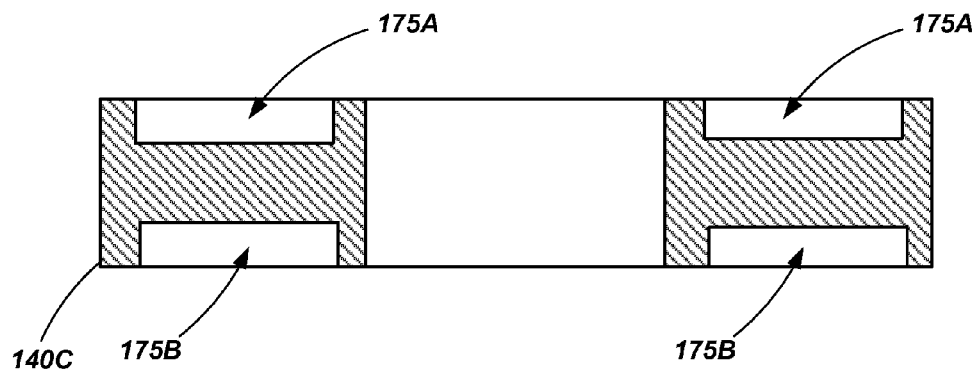

Referring to FIG. 8C, an enlarged, cross-sectional view a PCD component (e.g., a PCD compact shaped for use as an annular sector 164 of a PCD layer 142A or 142B) is shown. Base members 172 may be brazed or otherwise attached to the PCD compact and configured for coupling with a fastener 174 (see FIG. 8B) to fasten the annular sector 164 (or other-shaped PCD component) to a base component 140A or 140B of the runner 104. While only one base member is shown as being brazed to the annular sector 164 in FIGS. 8B and 8C, multiple of such members may be brazed to each annular sector 164. For example, in one particular embodiment, three distinct base members 172 may be brazed on to the annular sector 164. In other embodiments, a single, larger base member that is substantially similar in geometry to the annular sector (e.g., also exhibiting an annular sector geometry) may be brazed to the annular sector and have threaded holes tapped in for subsequent coupling with an associated base component 140A or 140B. Thus, assembly of the runner 104 may be accomplished with minimal brazing (e.g., the base members 172) while other components may be assembled using other coupling or attaching techniques. In other embodiments, the PCD components of the PCD layers 142A and 142B (e.g., the annular sectors) may be brazed to their associated base components 140A and 140B with the base components being subsequently assembled using, for example, fasteners or other mechanical components.

Referring now to FIGS. 9A-9D another embodiment of a runner 104 is illustrated. As with previously described embodiments, the PCD layers 142A and 142B of the runner 104 may be configured of a plurality of individual PCD components. While the embodiment illustrated by FIGS. 9A-9D depict the PCD layers 142A and 142B as being formed using annular sectors 164, other shapes may also be utilized such as has been described above. Each PCD layer 142A and 142B is associated with a base ring member 140A and 140B. The base ring members 140A and 140B may be formed, for example, of steel or of any other material suitable for attaching the annular sectors 164 of the PCD layers 142A and 142B. In one embodiment, the annular sectors 164 may be brazed to the base ring members 140A and 140B.

A central base component 140C may be formed, for example, of steel or another appropriate material. Annular grooves 175A and 175B are formed on each axial face of the central base component 140C. As seen best in FIG. 9B, the base ring members 140A and 140B are each positioned within an associated annular groove 175A and 175B of the central base component 140C. In one embodiment, the base ring members 140A and 140B may be secured to the central base component 140C by way of an interference fit (such as a press fit) with their associated annular grooves 175A and 175B.

Figure 10A:
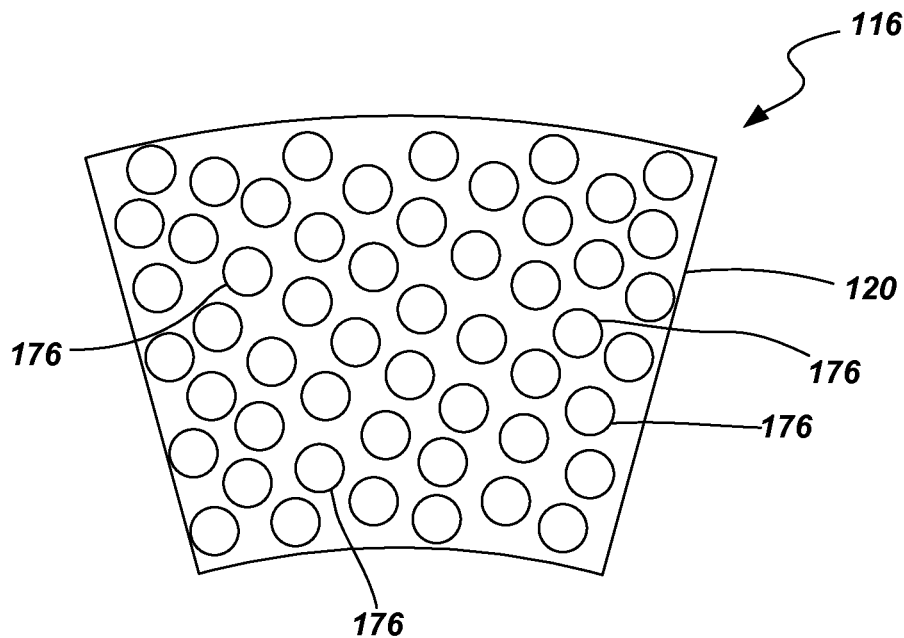
FIGS. 10A and 10B show respective top views of various embodiments of bearing elements.
Figure 10B:
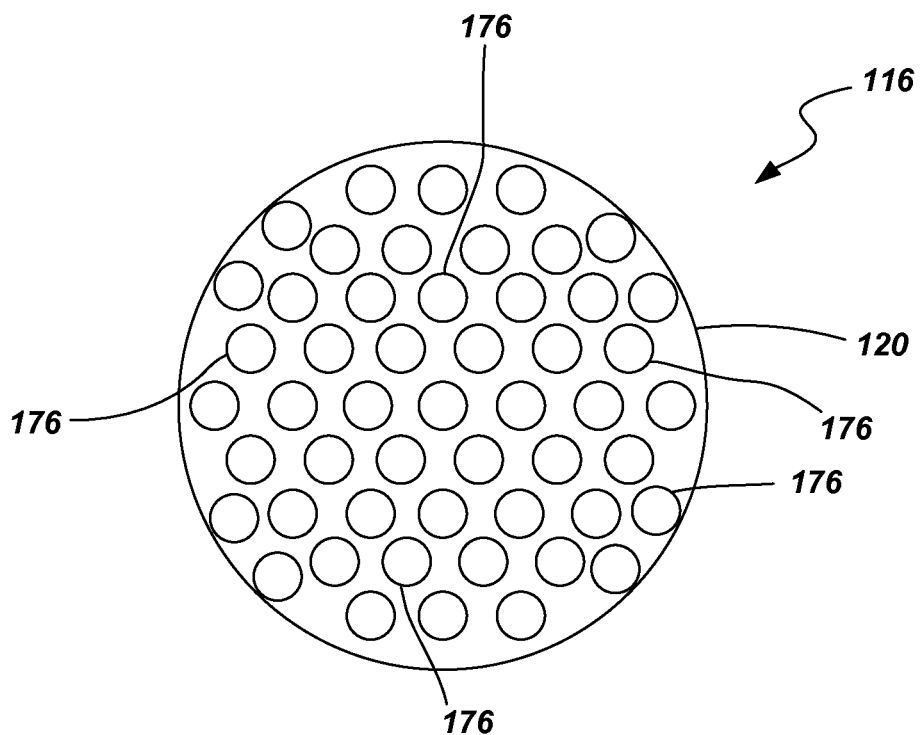

Referring briefly to FIG. 10A, a top view of another embodiment of a tilting pad bearing 116 is shown. The tilting pad bearing 116 exhibits a substantially annular sector shape, such as has been described above, and includes a base layer 120 with a plurality of PCD elements 176 (e.g., polycrystalline diamond compacts) coupled with the base layer to form a PCD layer 118 as a bearing surface. It is noted that the plurality of PCD elements 176 are not cut, formed or otherwise shaped so that they fit tightly next to each to form a substantially continuous bearing surface (such as with the embodiment shown in FIG. 5A). Rather, the PCD elements 176 are generally circular in shape and there are gaps between adjacent PCD elements 176 on a given tilting pad bearing 116. It is noted that, while such a configuration may not perform as an idealized hydrodynamic bearing, such may provide a lower cost alternative to other embodiments by enabling the use of conventional, prefabricated PCD compacts without substantial modification (e.g., through subsequent cutting or forming operations using laser or EDM processes) and by using fewer compacts to form the bearing surface. Additionally, such a configuration should provide increased cooling by virtue of the spaces between the individual PCD elements 176. The individual PCD elements 176 may be arranged according to a particular design or geometry or may be spaced so that they exhibit a specific distances with adjacent PCD elements 176. As shown in FIG. 10B, another embodiment may include a tilting pad bearing 116 that exhibits a substantially round geometry (viewed from above as with FIG. 10A) or some other geometry instead of an annular sector. The tilting pad bearing 116 shown in FIG. 10B includes a base layer 120 with a plurality of PCD elements 176 coupled with the base layer to form a PCD layer 118 as a bearing surface similar to that which is described with respect to the embodiment shown in FIG. 10A.

Figure 11:
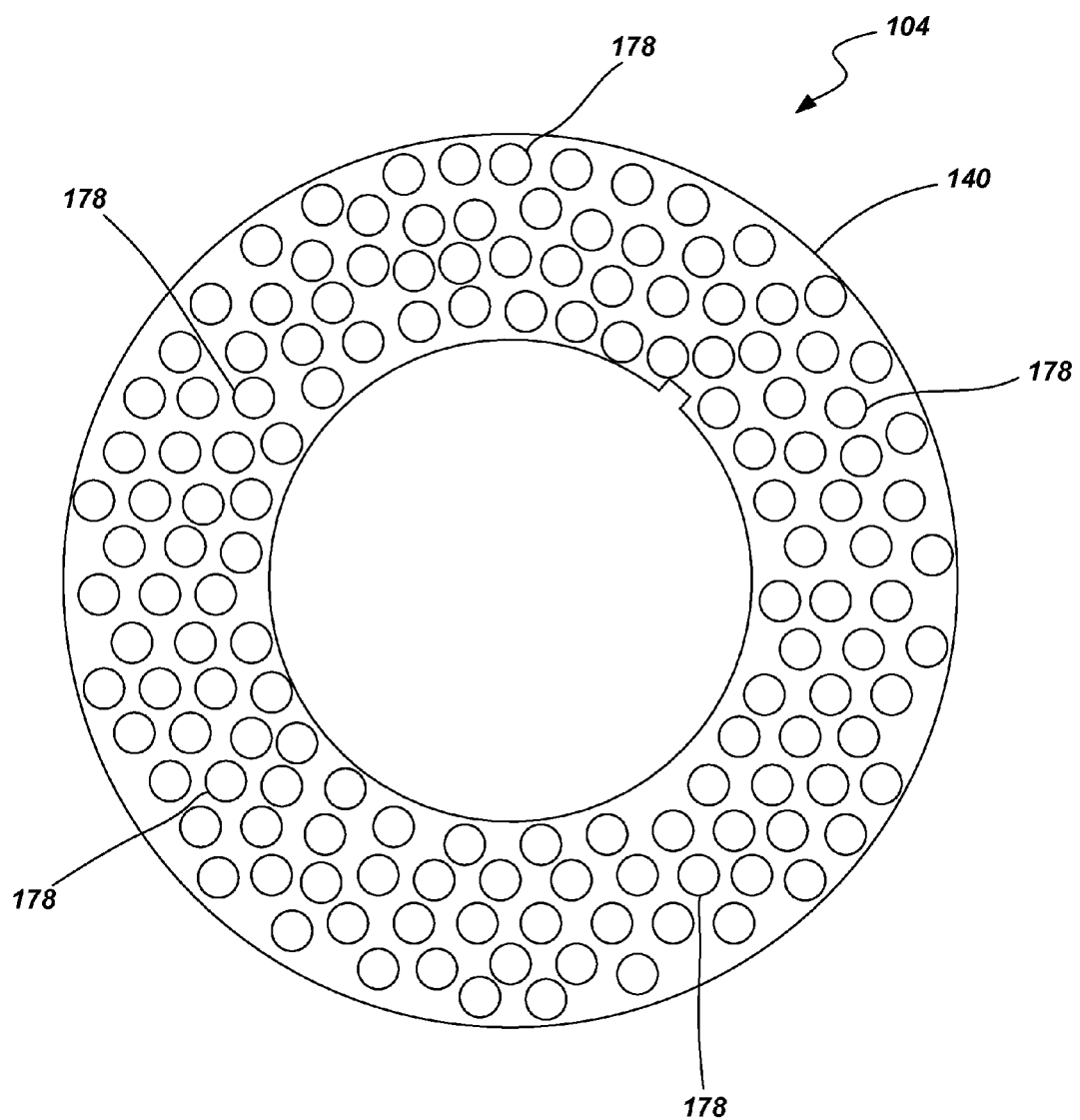
FIG. 11 shows a top view of a component of a bearing assembly.

Referring briefly to FIG. 11, a runner 104 is shown that includes a base layer 140 and a plurality of PCD elements 178 (such as polycrystalline diamond compacts) coupled with the base layer 140 to form a PCD layer (e.g., 142A or 142B). The PCD elements 178 are arranged in a similar manner as discussed with respect to the tilting pad bearings 116 shown in FIGS. 10A and 10B, being generally circular in cross-sectional geometry and being spaced apart from one another such that there are gaps or spaces between adjacent PCD elements 178. The individual PCD elements 178 may be arranged according to a particular design or geometry or may be spaced so that they exhibit a specific distances from adjacent PCD elements 178. It is noted that different embodiments of the runner 104 may be combined with different embodiments of the tilting pad bearings 116. For example, the runner 104 shown and described with respect to FIG. 11 may be combined in an assembly that includes titling pad bearings shown and described with respect to FIG. 5A or 5B. Of course other combinations of embodiments are also contemplated, without limitation.

Figure 12:
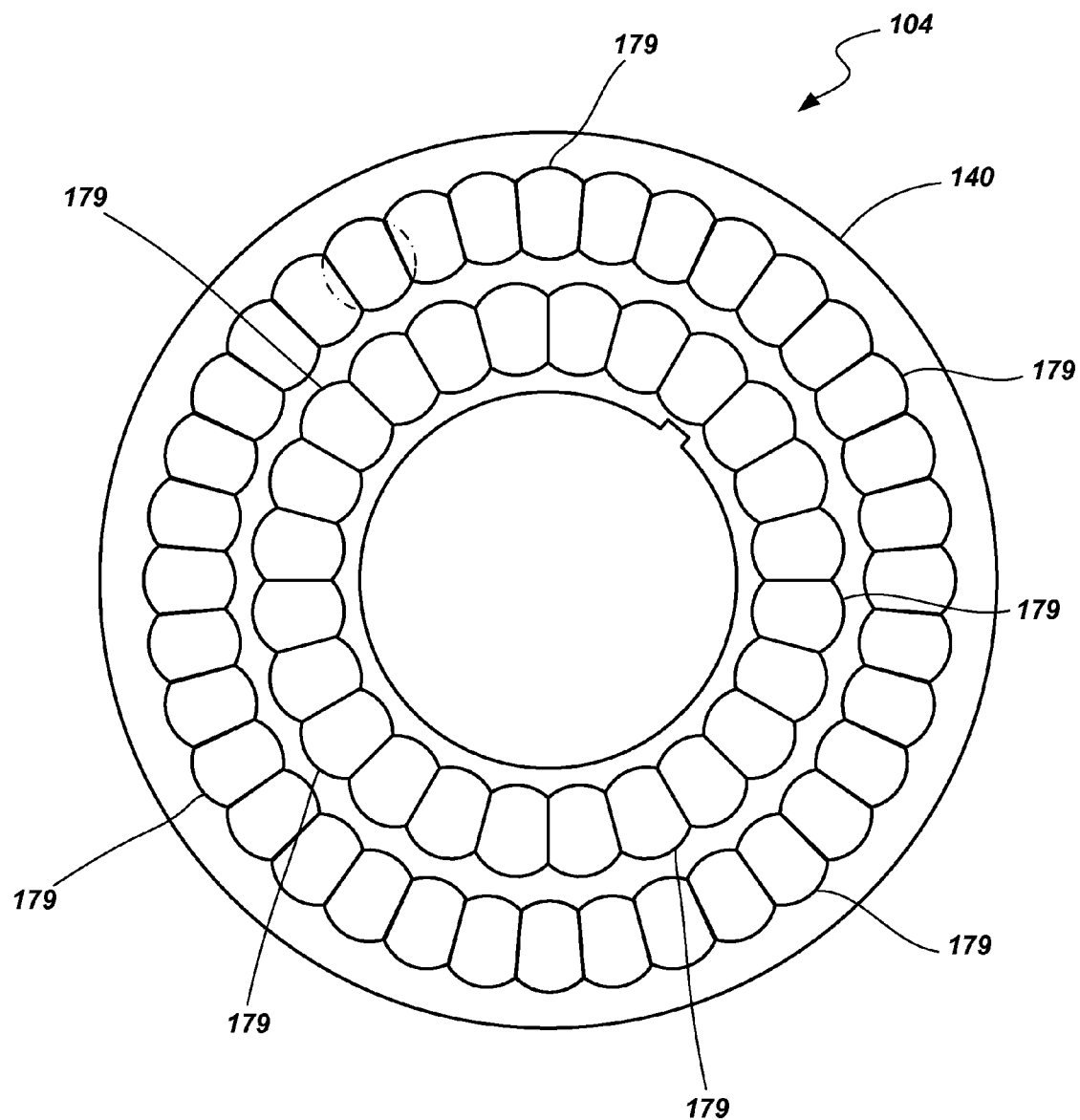
FIG. 12 shows a top view of a component of a bearing assembly.

Referring briefly to FIG. 12, another embodiment of a runner 104 is shown. The runner 104 includes a base layer 140 and a plurality of PCD elements 179 (such as polycrystalline diamond compacts) coupled with the base layer 140 to form a PCD layer (e.g., 142A or 142B). The PCD elements 179 shown in FIG. 12 are arranged in two circular rows, although a single row may be used or more rows than two may be employed. The PCD elements 179 may be formed from a cylindrical PCD compact, such as described above and as indicated again by dashed lines about one of the PCD elements 179. Such PCD compacts may be trimmed to exhibit a substantially wedge-shaped or annular sector-shaped geometry so as to fit the various PCD elements 179 into a circular pattern with relatively small gaps, or even substantially no gaps, being present between adjacent PCD elements 179.

Attaching the PCD layer to the base material (for either the tilting pad bearings 116 or the runner in 104 any of the various embodiments contemplated herein) may be accomplished a variety of processes such as, for example, by brazing, by e-beam welding, mechanical attachment or any other suitable configuration. In any case, attaching the PCD layer to the base material can provide certain challenges.

Referring to FIGS. 13A-13E, some examples of techniques for attaching the PCD layer to a base material are illustrated.

With initial reference to FIG. 13A, a bearing element 180 (which may be used as a tilting pad bearing or as a runner) may be formed by providing a base layer 182 and forming a pocket 184 in the base layer 182. A PCD element 186 (e.g., a polycrystalline diamond compact that includes a diamond table 188 formed on a substrate 190) may be disposed in the pocket 184. The PCD element 186 may then be joined (e.g., brazed) to the base layer 182 to fix it relative to the base layer 182. The base layer 182 and the PCD element 186 may be held in place during joining by use of proper fixtures and/or by appropriate application of force to the components of the bearing element 180. As previously mentioned, the base layer 182 and the substrate may be formed of substantially similar or suitable materials or of materials that exhibit suitable coefficients of thermal expansion to help reduce or prevent cracking or the induction of thermal stresses into the resulting bearing element 180. While a single pocket 184 is shown in the base layer 182, multiple pockets may be formed with a PCD element 186 being disposed in each pocket if desired. The pocket 184 may be shaped to correspond with the cross-sectional geometry of the compact 186. Thus, for example, if the PCD element 186 is substantially cylindrical in shape, the pocket 184 may be substantially cylindrically shaped to receive the compact therein in a substantially mating relationship.

Referring to FIG. 13B, a bearing element 180 may be formed in accordance with another embodiment by providing a pocket 184 in a base layer 182 and disposing a plurality of PCD elements 186 within the pocket 182. In one embodiment, the PCD elements 186 may be abutted against each other so that they are in contact with each other and exhibit little or no space therebetween. The PCD elements 186 may exhibit a variety of shapes and, in one embodiment, may be configured as squares or rectangles that are combined together to provide, for example, a bearing surface similar to that described with respect to the tilting pad bearing shown in FIG. 5A.

The use of a pocket to effect the joining of the base layer 182 and the PCD element 186 will help to maintain alignment of the components during any heating that may take place in the joining process. The PCD elements 186 may be joined with the base layer 182, such as by brazing, while they are held in position within the pocket 184 by an applied force or by appropriate fixtures. The pocket 184 may be shaped to correspond with the combined cross-sectional geometry of the plurality of PCD elements 186. Thus, for example, the plurality of compacts 186 may be shaped and combined to define a substantially annular sector shape, with the pocket being similarly shaped to receive such a combination of PCD elements 186. Of course, other geometries and configurations are also contemplated. Once secured to the base layer 182, the PCD elements 186 may be machined, ground or lapped to provide a substantially coplanar surface (i.e., within defined tolerances) for the resulting bearing element 118.

It is noted that, while the embodiments shown and described with respect to FIGS. 13A and 13B are described in terms of joining the PCD elements 186 with the base material 182 through processes such as brazing, other means of attaching or coupling may also be used. In one example, the pockets 184 and the compacts 186 may be configured to effect an interference fit (i.e., a press fit or a shrink fit). For example, the pocket 184 may be configured to be slightly smaller than the PCD compact 186 that is to be disposed therein. The base layer 182 may then be heated to make it expand and/or the PCD element(s) 186 may be cooled to make it (them) contract prior to disposing the PCD element(s) 186 in the pocket 184. After placing the PCD elements(s) 186 in the pocket 184, which may require application of force, the two components may be brought to a common temperature causing the pocket 184 to "shrink" and/or the PCD element 186 to expand resulting in the PCD element 186 being tightly grasped by the pocket 184 of the base layer 182.

Referring briefly to FIG. 13C, in another embodiment, a bearing element 180 may be formed by placing a base layer 182 and the PCD element 186 in a fixture 192 and holding the components in alignment during brazing. In such a configuration, it is not necessarily required to have a pocket formed in the base layer 182. Rather, the PCD element 186 may be simply abutted against a surface of the base layer 182 and maintained in that position by the fixture 192. For example, the fixture 192 may be configured to hold the sidewalls of the compact 186 in alignment with the side walls of the base layer 182 while a brazing, bonding or some other joining process takes place.

Referring to FIG. 13D, in accordance with another embodiment, a bearing element 180 may be formed by placing a PCD elements 186 on a base layer 182 and joining them together, such as by brazing. The PCD element 186 and/or the base layer 182 may be originally formed as an "oversized" component, meaning that it is larger than its final design dimensions. The excess of the base layer 182 and/or the PCD element 186 may be cut or machined to final dimensions as indicated by dotted lines 194 such that it looks as shown in FIG. 13E. Such a process should eliminate some concerns of alignment between the PCD element 186 and the base layer 182 during the joining process. Referring specifically to FIG. 13E, such a bearing element may also be formed by aligning the compact 186 with a similarly sized base layer 182 and E-beam welding the two components together. E-beam welding may involve less heating of the base material 182 and compact 186 and may result in less residual stress and warping of such components.

Figure 14A:
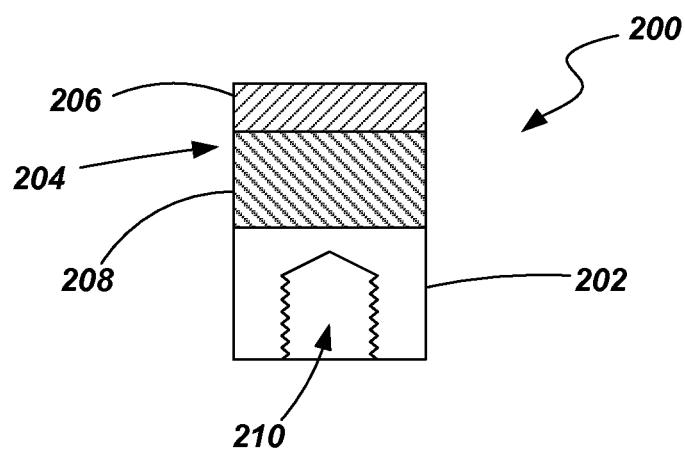
FIGS. 14A and 14B show side views of additional embodiments of bearing elements.
Figure 14B:
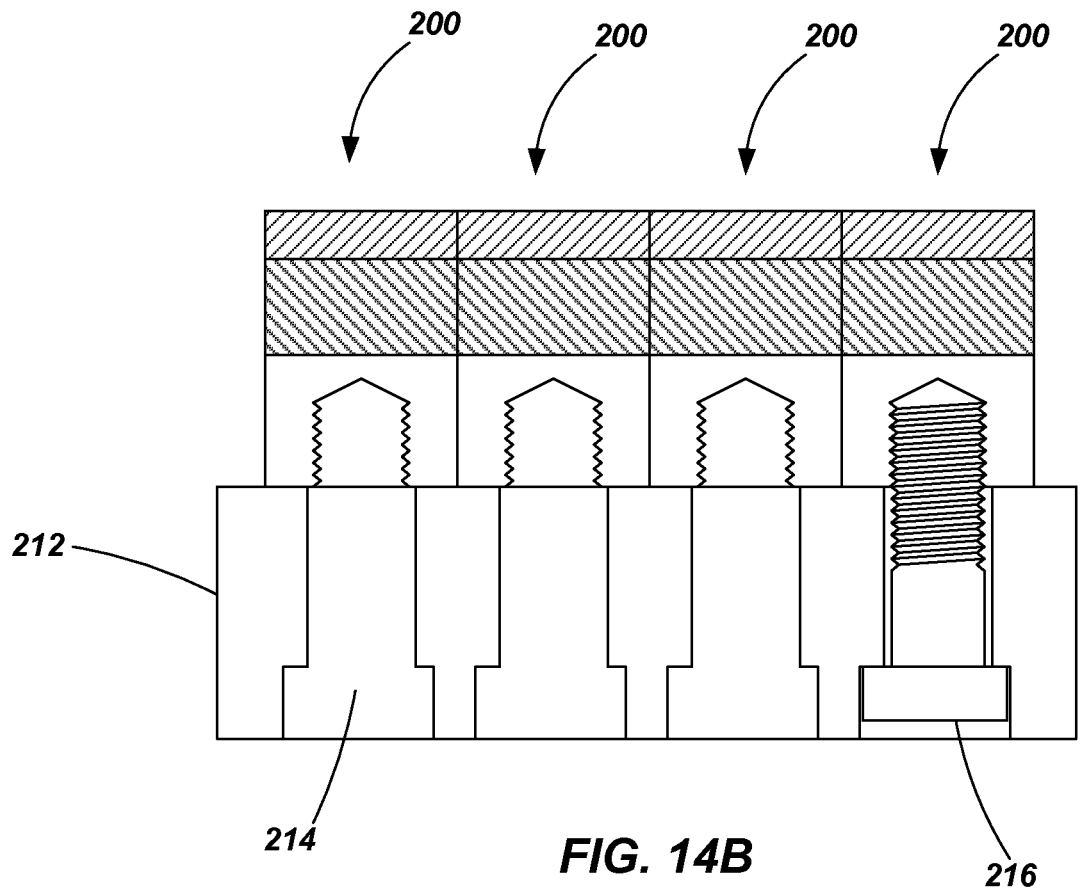

Referring to FIGS. 14A and 14B, another embodiment of a bearing element 200 is shown. The bearing element 200 includes a first base layer 202 which is pre-brazed to a PCD element 204. The PCD element 204 may include a diamond table 206 bonded to a substrate 208 such as has been described hereinabove. The first base layer 202 may be formed, for example, of steel, another metal, or a metal alloy. A threaded hole 210 may be formed in the first base layer. As seen in FIG. 14B, a plurality of bearing elements 200 may be positioned adjacent each other and coupled with a second base layer 212. The second base layer 212 may include a plurality of through holes 214 that align with the holes 210 of individual bearing elements 200 and threaded fasteners 216 may be used to couple the second base layer 212 with the individual bearing elements 200. As with previously described embodiments, the bearing elements 200 may be formed to exhibit various shapes and sizes. For example, in one embodiment, the bearing elements 200 may be substantially cylindrical. In another embodiment, they may be configured to exhibit a square, rectangular or other polygonal shape. They may be spaced apart (e.g., such as shown with respect to FIG. 10A, 10B or 11) or they may be placed adjacent to each other and fit together to form a substantially continuous surface (e.g., such as shown in FIG. 5A, 6A or 6B). Also, as with other embodiments, after assembly of the bearing elements 200 with the second base layer 212, the bearing elements may be machined, ground, lapped or otherwise processed to obtain substantially coplanar bearing surfaces.

Figure 15A:
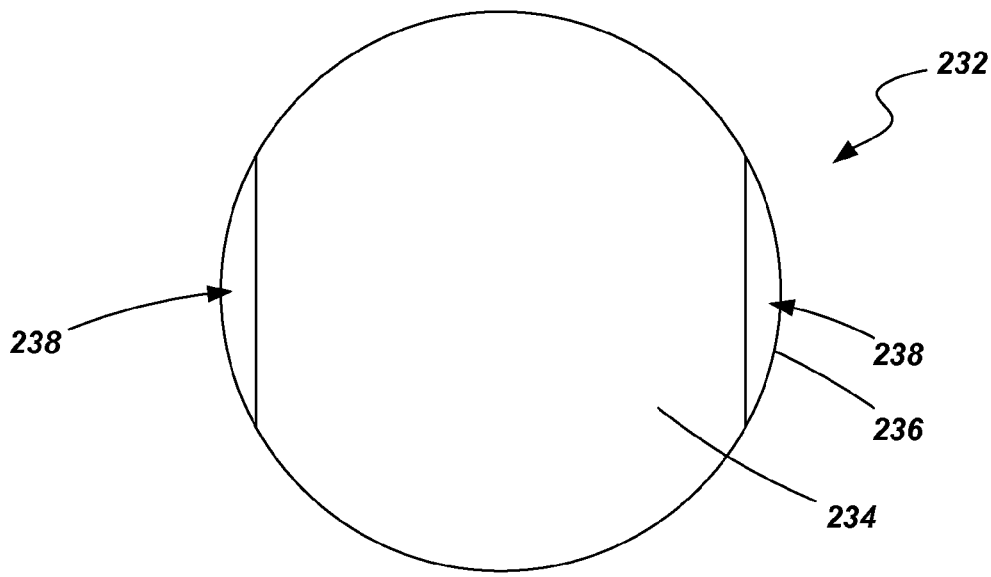
FIG. 15A shows a top view of a bearing element component.
Figure 15B:
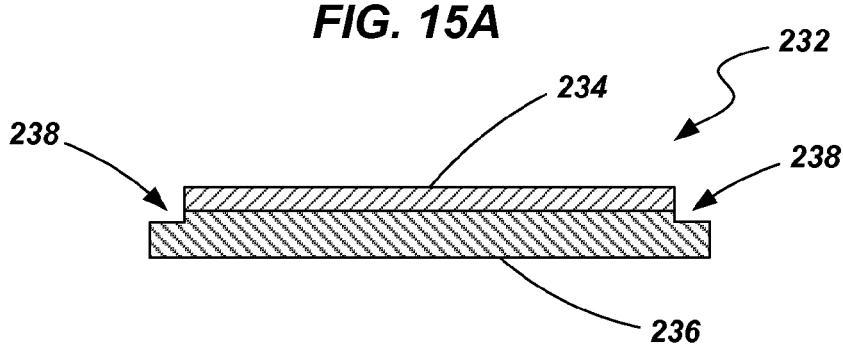
FIG. 15B shows a cross-sectional view of the bearing element component of FIG. 15A.
Figure 15C:
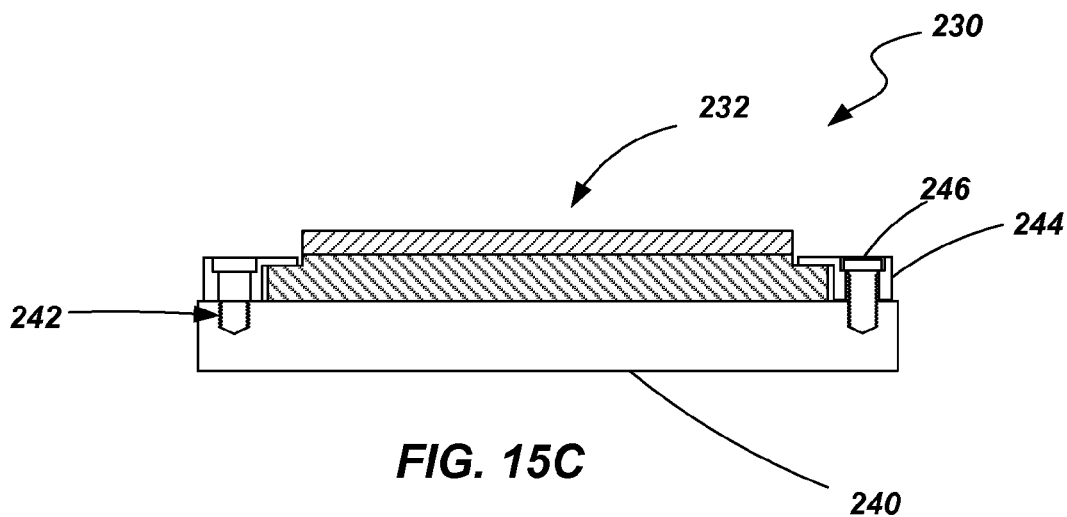
FIG. 15C shows a partial cross-sectional view of the bearing element component of FIGS. 15A and 15B assembled with a backing member.

Referring to FIGS. 15A-15C, another embodiment of a bearing element 230 is shown. FIGS. 15A and 15B depict a PCD element 232 having a diamond layer 234 bonded with a substrate 236. A pair of shoulders 238 are formed in the PCD element 232 at diametrically opposing sides. As shown in FIG. 15C, the PCD element 232 is placed on a base layer 240 which has a plurality of threaded blind holes 242 formed therein. Clamps 244 may be coupled to the base layer 240 by way of threaded fasteners 246. The clamps 244 include an extension or projection 246 that engages a shoulder 238 of the PCD element 230 to hold the element 230 securely against the base layer 240. It is noted that the shoulders formed in the PCD element 232 need not be two in number, or necessarily diametrically opposed in location. Rather, other quantities and arrangements of shoulders, tapered geometries, or other suitable engagement features are contemplated. In one embodiment, a shoulder may be formed about the entire periphery of the compact 232 so that alignment issues with respect to the clamp locations are negated. Also, any number of clamps 246 may be utilized, including a single ring clamp that extends about at least a portion of the periphery of the compact 232.

Referring to FIGS. 16A-16D, another embodiment is shown for attaching a PCD element 260 to a base member 262. FIGS. 16A and 16B show a base member 262 that includes a recessed surface 264 exhibiting an arcuate surface. For example, the recessed surface 264 may exhibit a substantially spherical geometry (such as a portion of a sphere). FIG. 16C shows a PCD element 260 being attached to the base member 262 by way of a layer of brazing material 266. The PCD element 262 and brazing material 266 may substantially conform to the recessed surface 264 of the base member 262 while such materials are at elevated temperatures during the brazing process. However, due to the pairing of materials based on coefficients of thermal expansion (e.g., selecting materials with a desired differential in their respective coefficients of thermal expansion), the base member 262 may warp or deform upon cooling to atmospheric temperatures from the elevated brazing process temperatures. The PCD element 260 now exhibits a substantially flat or planar surface while the bottom or lower surface of base member 262 may be arcuate or non-planar.

Following the manufacture of the bearing elements, regardless of the manufacturing process used, the bearing elements may be incorporated into an assembly to form, for example, a bearing surface on a runner or a collective bearing surface in a titling pad bearing assembly. Again, the bearing surfaces of such assemblies may be lapped, machined or ground to defined a substantially coplanar bearing surface.

Figure 17:
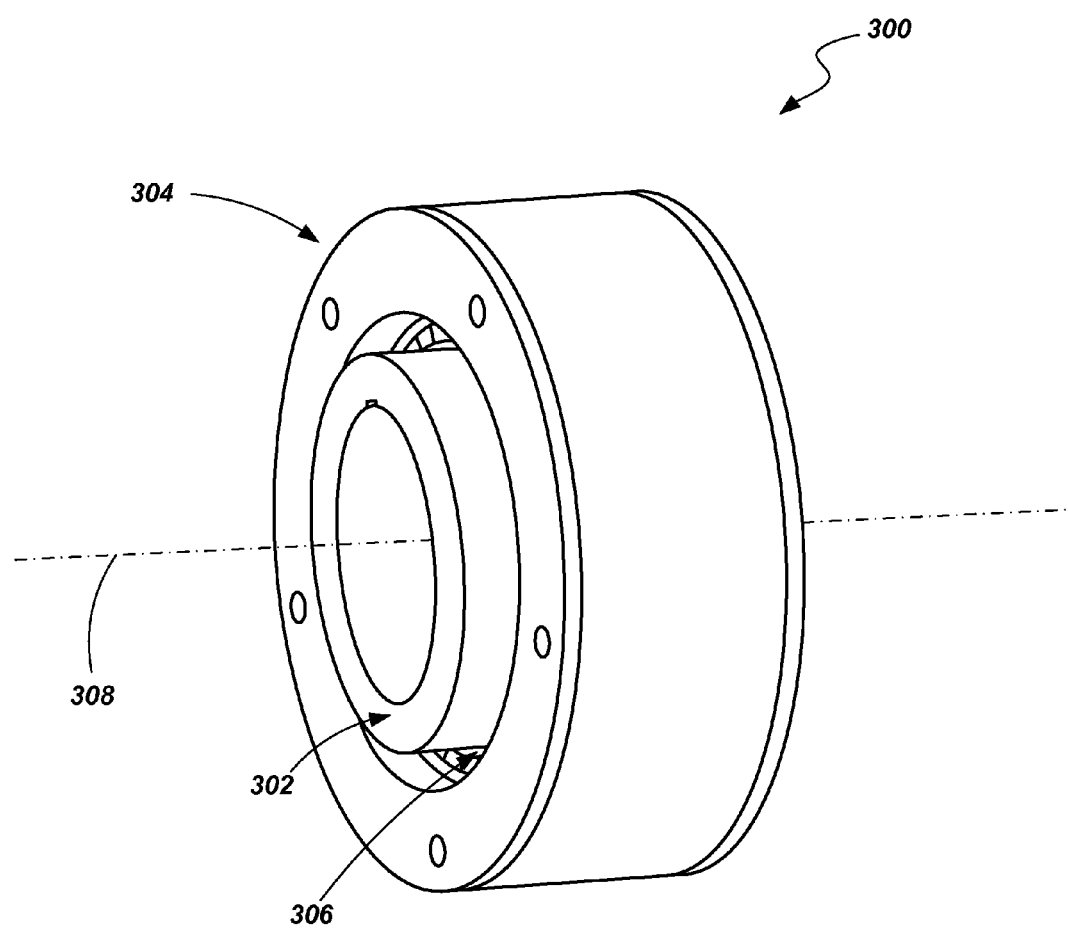
FIG. 17 shows a perspective view of a bearing assembly.

Referring now to FIG. 17 a radial bearing assembly 300 is shown. In one embodiment, the bearing assembly 300 includes a first bearing 302 configured as a rotor and a second bearing ring 304 configured as a stator. In other embodiments, the first bearing ring 302 may be configured as a stator and the second bearing ring 304 may be configured as a rotor. The second bearing ring 304 defines an opening 306 that is substantially centered about an axis 308 and the first bearing ring 304 extends through the opening 306. Whichever bearing ring is configured as a rotor is configured to rotate generally about the axis 308.

Figure 18A:
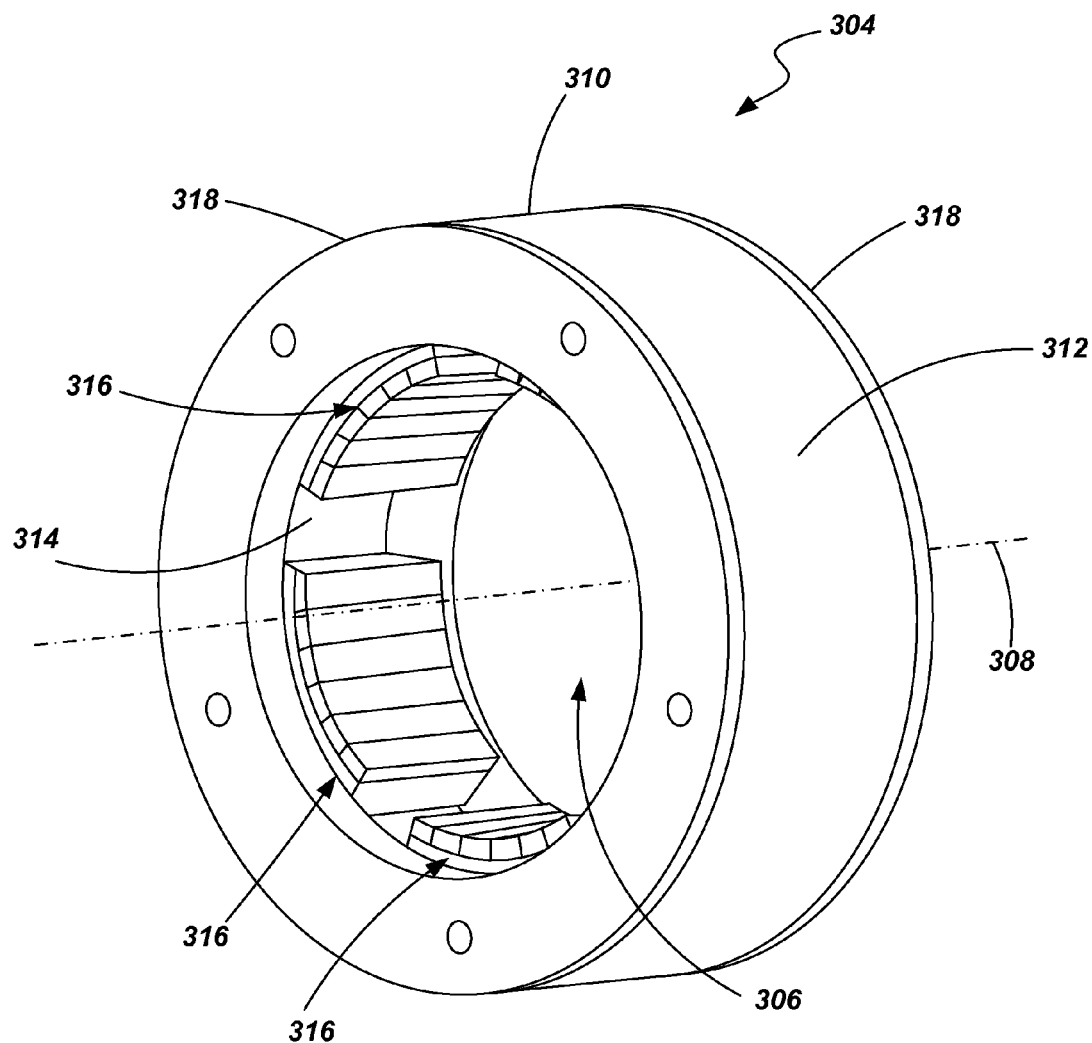
FIG. 18A shows a perspective view of various components of the bearing assembly shown in FIG. 10.
Figure 18B:
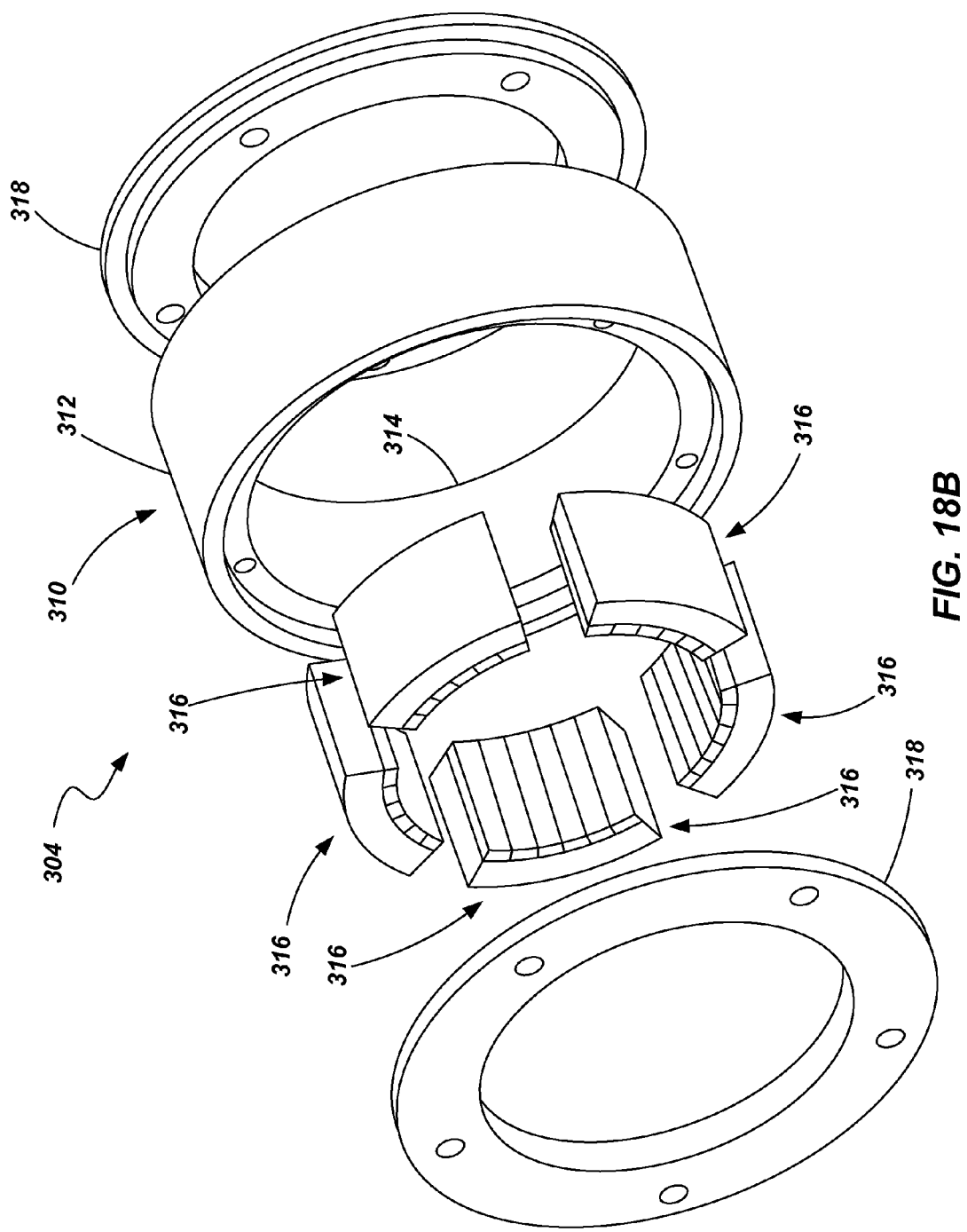
FIG. 18B shows an exploded view of the components shown in FIG. 18A.
Figure 18C:
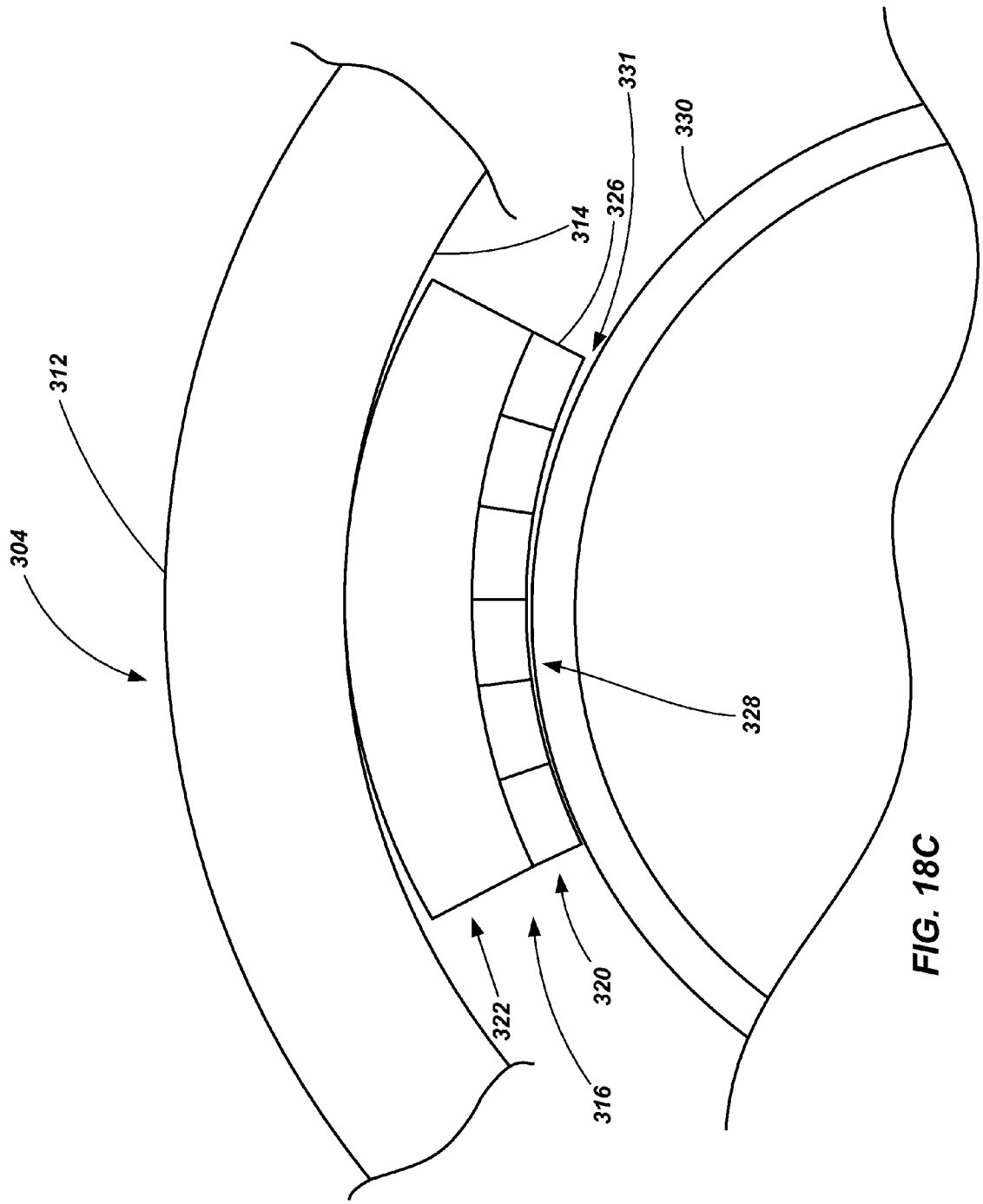
FIG. 18C shows a partial side view of the components shown in FIGS. 18A and 11B.

Referring to FIGS. 18A-18C, the second bearing ring 304 includes a body 310 having an outer radial surface 312 and an inner radial surface 314 that defines, in large part, the opening 306. A plurality of tilting pad bearings 316 are positioned against the inner radial surface 314 at circumferentially spaced locations. The titling pad bearings 316 may be held in place within the body 310 by a pair of plates 318 coupled with opposing axial sides of the body 310. As best seen in FIG. 18C, each tilting pad bearing 316 includes a diamond layer 320 (or other superabrasive layer) attached to a base layer 322. The diamond layer may include a plurality of PCD elements 326 disposed next to each other and collectively defining a substantially arcuate surface 328. The PCD elements 326 may each be configured to include a diamond table and a substrate such as has been described hereinabove. The plurality of tilting pad bearings 316 collectively define a bearing surface which engages a bearing surface 330 of the first bearing ring 302, separated by a fluid film which may develop into a fluid film wedge 331 during relative rotation of the first bearing ring 302 and the second bearing ring 304 as will be appreciated as will be appreciated by those of ordinary skill in the art. In one embodiment, it is noted that the base layer 322 of the tilting pad bearings 316 exhibits a radius that is smaller than the radius of the inner radial surface 314 of the body such that the tilting pad bearings 316 may rock relative to the body 310.

As seen in FIGS. 19A and 19B, in one embodiment the bearing elements 326 may be configured to exhibit a substantially trapezoidal cross-sectional geometry with a narrower upper portion (i.e., across the upper surface of the diamond layer 356) and a wider lower portion (i.e., across the lower surface of the substrate 354). Such a configuration enables a plurality of bearing elements 326 to be arranged with sidewalls 358 of one bearing element 326 being positionable adjacent the sidewalls 358 of other bearing elements 326 such that the diamond layers of the plurality of bearing elements 326 collectively define a portion of a substantially cylindrical bearing surface. In one embodiment, the upper surface of the individual bearing elements 326 may be arcuate (i.e., concave, as shown) to define a portion of a cylindrical bearing surface. The arcuate profile may be machined on each PCD compact individually prior to assembly or the entire assembly may be machined to define the arcuate bearing surface after the bearing elements 326 are otherwise assembled. In another embodiment, the upper surface of each bearing element 326 may be substantially planar such that the resulting bearing surface is (at least initially, prior to wear) approximated as a portion of a cylindrical surface. In one embodiment, one or more chamfers 360 may be formed between the upper surface of the diamond layer 356 and a side wall 358 of the bearing element 326, as indicated in FIG. 19A by dashed lines. In other embodiments, other edge treatments may be used, such as the forming of a radius between the upper surface of the diamond layer 356 and a side wall 358 of the bearing element. In other embodiments, one or more chamfers may be combined with one or more radii along the transition edge of two such surfaces.

Referring briefly to FIG. 20, in one embodiment, PCD elements 326 (or other PCD elements such as PCD elements 352 described with respect to FIGS. 22A and 22B below) may be formed from a PCD cutting tool blank 340. In one particular example, a cutting tool blank 340 having a diameter of approximately 2.36 inches may be cut into six individual PCD elements 326 and 352 each having a length of approximately 1.6 inches and a width of approximately 0.3 inch. Of course other sizes and geometries are contemplated and such an example should not be considered limiting.

Figure 21A:
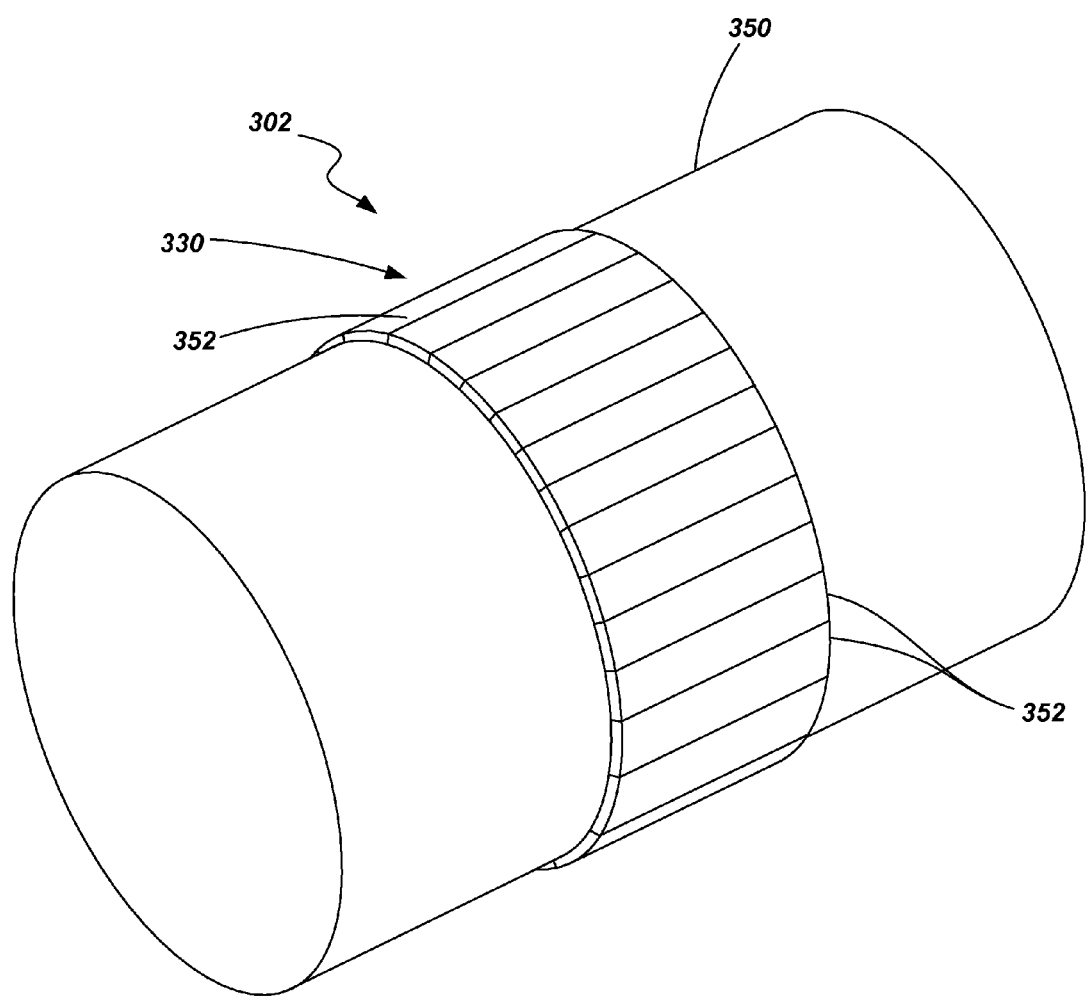

Referring to FIGS. 21A and 21B, the first bearing ring 302 includes a body portion 350 that serves as a base layer and a plurality of bearing elements 352 coupled with the body portion 350 to define the bearing surface 330 of the first bearing ring 302. Each of the bearing elements 352 may be configured as PCD elements including a substrate 354 and a diamond layer 356 such as has been previously described. As seen in FIGS. 22A and 22B, in one embodiment the bearing elements 352 may be configured to exhibit a substantially trapezoidal cross-sectional geometry with a wider upper portion (i.e., across the upper surface of the diamond layer 356) and a narrower lower portion (i.e., across the lower surface of the substrate 352). Such a configuration enables a plurality of bearing elements 352 to be arranged with the sidewalls 358 of one bearing element 352 being positioned adjacent the sidewalls 358 of other bearing elements 352 such that the diamond layers of the plurality of bearing elements 352 collectively define a substantially cylindrical bearing surface 330 (FIG. 21A).

In one embodiment, the upper surface of the individual bearing elements 352 may be arcuate (i.e., convex, as shown) to define the cylindrical bearing surface 330. The arcuate profile may be machined on each PCD compact individually prior to assembly or the entire assembly may be machined to define the arcuate bearing surface 330 after the bearing elements 352 otherwise assembled. In another embodiment, the upper surface of each bearing element 352 may be substantially planar such that the resulting bearing surface 330 is (at least initially, prior to wear) approximated as a cylindrical surface. In one embodiment, one or more chamfers 360 may be formed between the upper surface of the diamond layer 356 and a side wall 358 of the bearing element 352, as indicated in FIG. 22A by dashed lines. In other embodiments, other edge treatments may be used, such as the forming of a radius between the upper surface of the diamond layer 356 and a side wall 358 of the bearing element. In other embodiments, one or more chamfers may be combined with one or more radii along the transition edge of two such surfaces.

Referring now to FIGS. 23A and 23B, a tilting pad bearing 316 for use in the second bearing ring 304 is shown in accordance with another embodiment. The titling pad bearing 316 includes a base layer 322 and a plurality of PCD elements 326. The PCD elements 326 may each be configured to include a diamond table and a substrate such as has been described hereinabove. However, rather than exhibiting a geometry that is elongated with a substantially square or rectangular cross-section (with an optional arcuate bearing) such as described with respect to the embodiment shown in FIGS. 18A-18C, the PCD elements 326 are substantially cylindrical and arranged in an array of rows and columns to define a collective bearing surface. In one embodiment, such PCD elements 326 may comprise conventional PCD compacts which are subsequently attached to the base layer 322 (e.g., by brazing or other appropriate processes).

Referring to FIGS. 24A and 24B, a tilting pad bearing 316 for use in the second bearing ring 304 is shown in accordance with yet another embodiment. The titling pad bearing 316 includes a base layer 322 and a single PCD element 326. The PCD element 326 may be configured to include a diamond table and a substrate such as has been described hereinabove. In one embodiment, the PCD element 326 may be formed of a single cutting tool blank which is subsequently bonded to the base layer 322. It is noted that in such an embodiment, the thickness of the diamond layer in the PCD element 326 will need to be of sufficient thickness to account for the concave bearing surface that will be formed (either through various fabrication processes prior to assembly, or to account for the formation of such a surface due to wear).

Referring to FIGS. 25A and 25B, a bearing ring 302 is shown in accordance with another embodiment. The bearing ring 302 includes a body 350 forming a base layer and a plurality of bearing elements 352 that are formed as individual PCD elements. The PCD elements may each be configured to include a diamond table and a substrate such as has been described hereinabove. However, rather than exhibiting a geometry that is elongated with a substantially trapezoidal cross-section (with an optional arcuate bearing) such as described with respect to the embodiment shown in FIGS. 21A and 21B, the PCD elements are substantially cylindrical and arranged in a plurality of rows extending axially along the body 350 to define a collective bearing surface. In one embodiment, such bearing elements 352 may comprise conventional PCD compacts which are subsequently bonded with the body 350.

Figure 26:
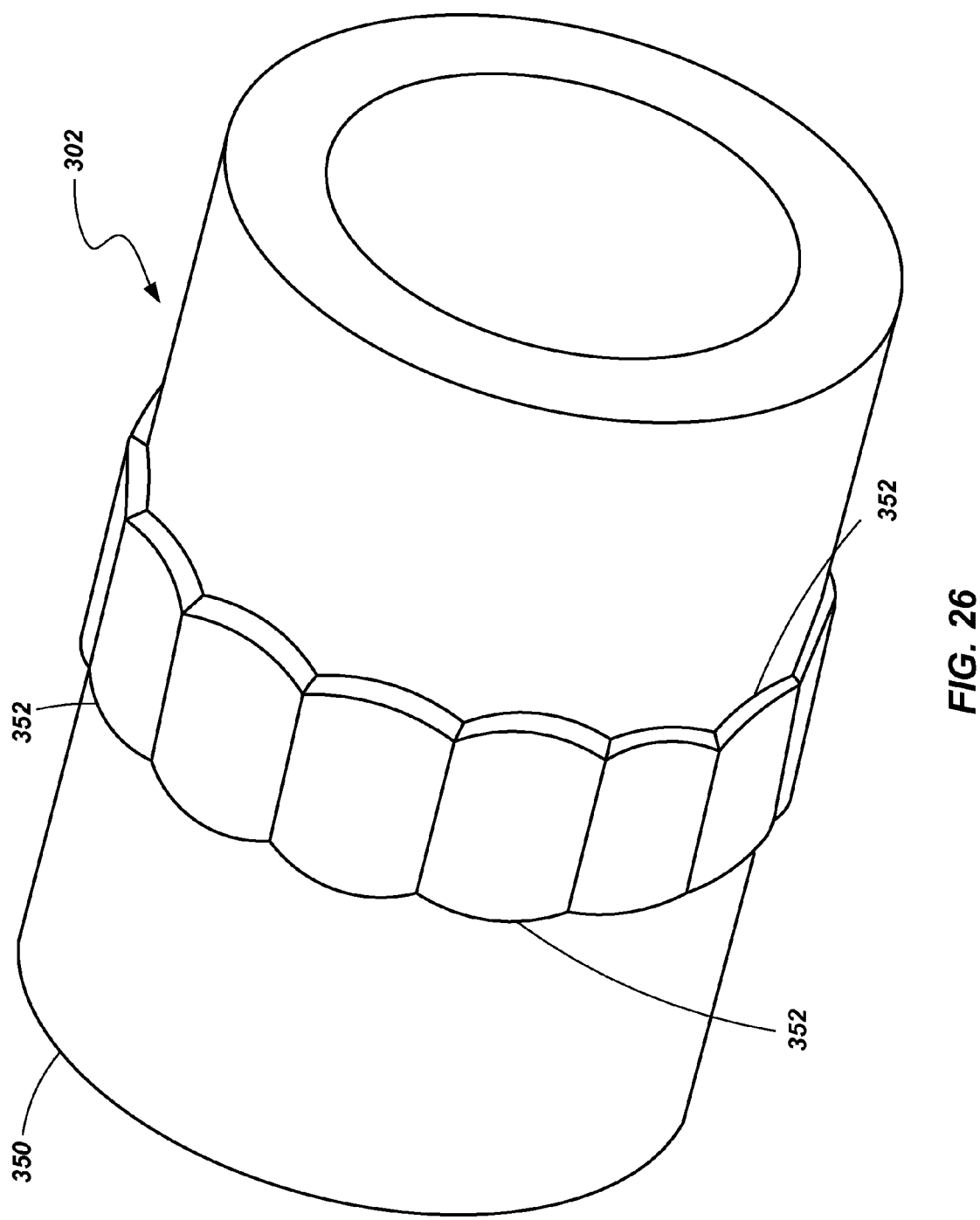
FIG. 26 is a perspective view of a bearing component for a bearing assembly.

Referring to FIG. 26 a bearing ring 302 is shown in accordance with another embodiment. The bearing ring 302 includes a body 350 forming a base layer and a plurality of bearing elements 352 that are formed as individual PCD elements. The PCD elements may each be configured to include a diamond table and a substrate such as has been described hereinabove. However, rather than exhibiting a geometry that is elongated with a substantially trapezoidal cross-section (with an optional arcuate bearing) such as described with respect to the embodiment shown in FIGS. 21A and 21B, the PCD elements may be formed from conventional cylindrical PCD compacts (e.g., a 19 mm or a 13 mm diameter PCD compact) which is shaped to include two opposing substantially linear side surfaces. A linear (or planar) side surface of one PCD element may abut a linear (or planar) side surface of another, adjacent PCD element. The bearing elements 352 may exhibit a substantially trapezoidal cross-sectional geometry such that they may be arranged along the body 350 to define a collective bearing surface (e.g., such as described with respect to FIGS. 21A, 21B, 22A and 22B).

Figure 27:
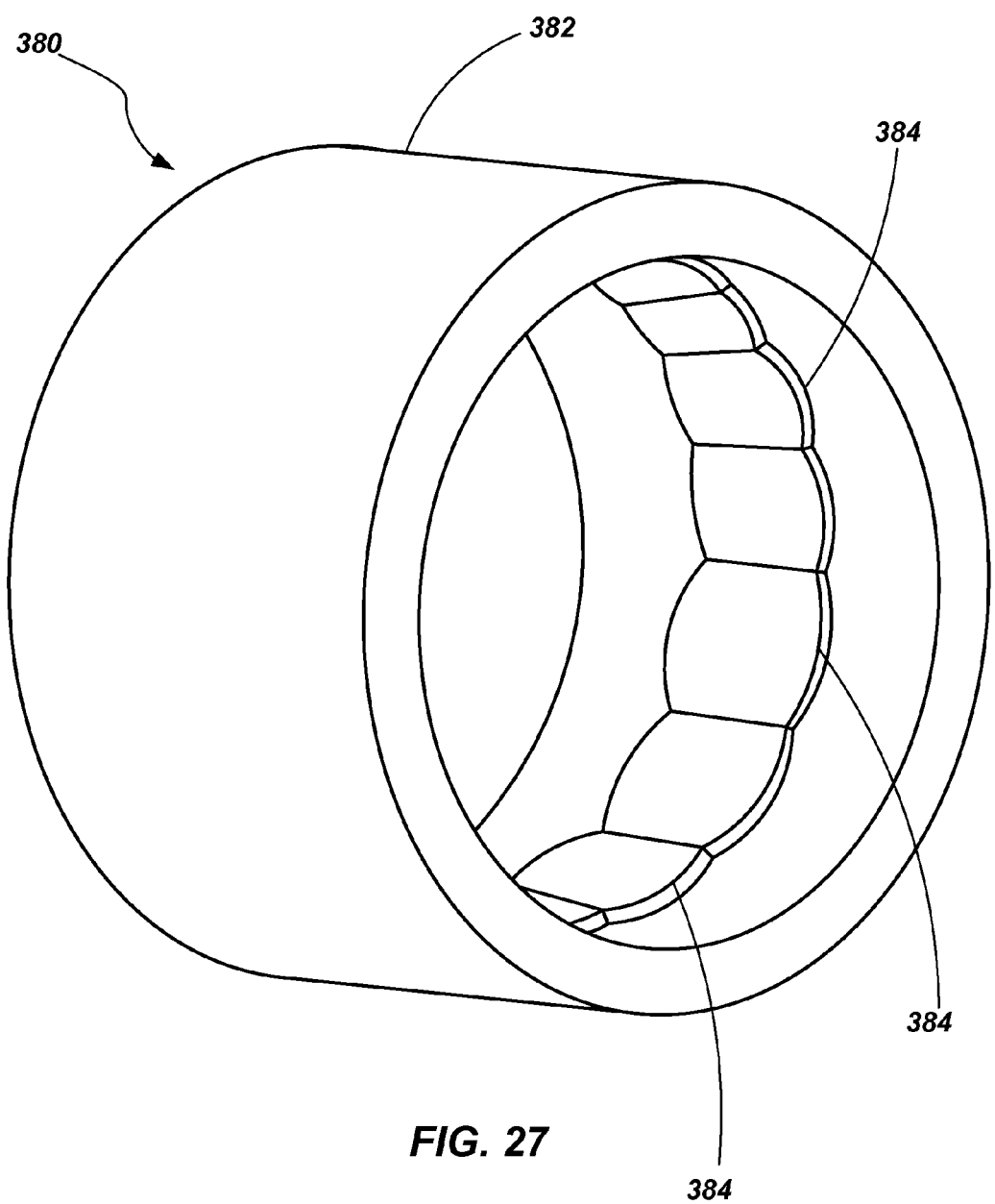
FIG. 27 is a perspective view of a bearing component for a bearing assembly.

Referring to FIG. 27 another bearing ring 380 is shown in accordance with another embodiment. The bearing ring 380 may be used, for example as the second bearing ring in the assembly 300 depicted in FIG. 17. However, the bearing ring 380 is not configured with tilting pad bearings as is the previously described bearing ring 304 associated with the bearing assembly 300. The bearing ring 380 includes a body 382 forming a base layer and a plurality of bearing elements 384 that are formed as individual PCD elements. The PCD elements may each be configured to include a diamond table and a substrate such as has been described hereinabove. The PCD element may be formed from conventional cylindrical PCD compacts (e.g., a 19 mm or a 13 mm diameter PCD compact) which is shaped to include two opposing substantially linear side surfaces. A linear (or planar) side surface of one PCD element may abut a linear (or planar) side surface of another, adjacent PCD element. The bearing elements 384 may exhibit a substantially trapezoidal cross-sectional geometry such that they may be arranged along n interior radial surface of the body 382 to define a collective bearing surface. Of course, PCD elements 384 exhibiting similar geometries may be used to form tilting pad bearings if desired and used in an assembly similar to the second bearing ring 304 described hereinabove.

Figure 28:
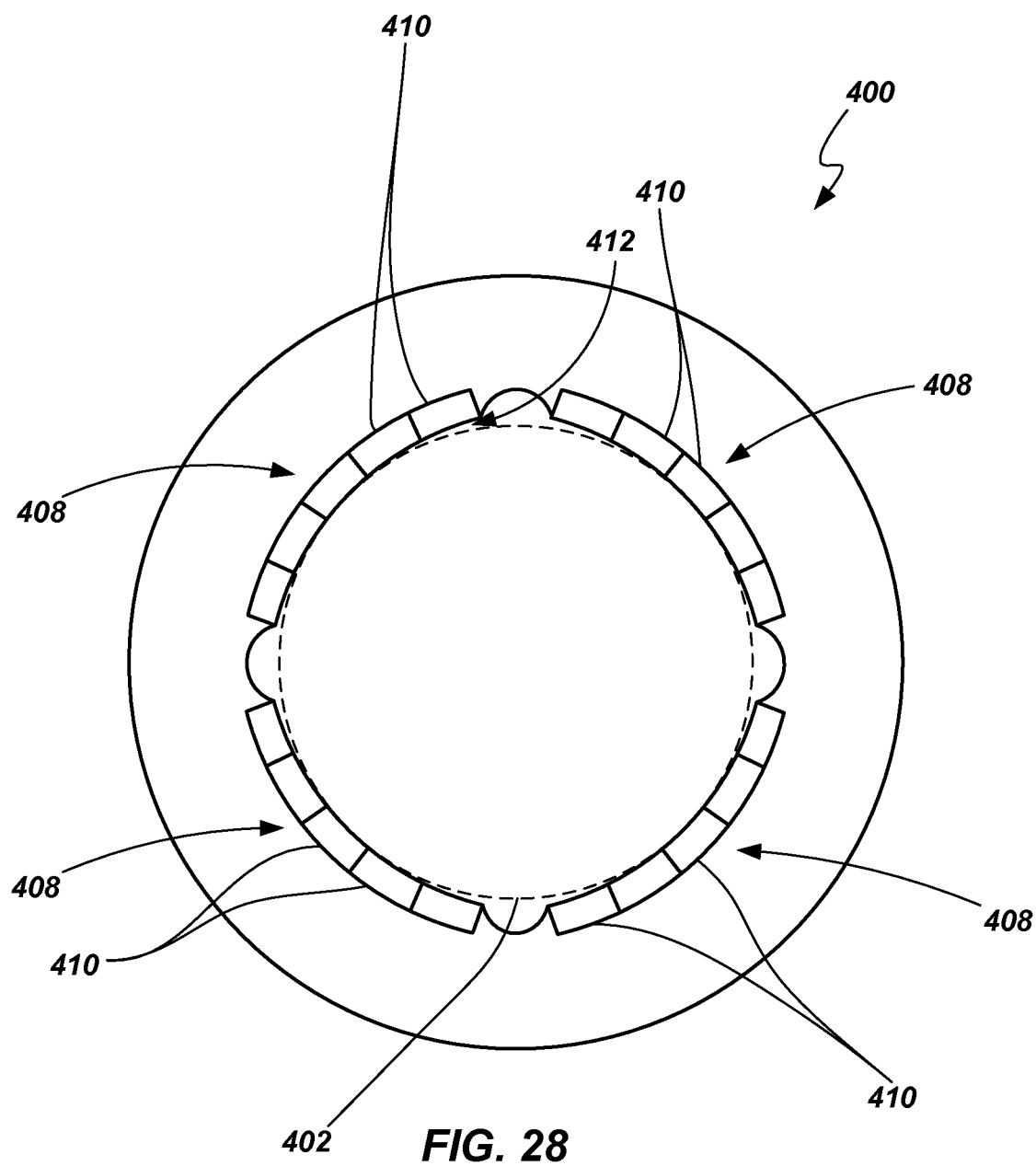
FIG. 28 shows a side view of a component of a bearing assembly.

Referring briefly to FIG. 28, another bearing assembly 400 is shown. The bearing assembly 400 is configured as a radial bearing and may include a first bearing ring 402 (shown in dashed lines) and a second bearing ring 404. The first bearing ring 402 may be configured such as one of the previously described embodiments. The second bearing ring 404 is configured as a multi-lobe bearing and includes a body 406 and a plurality of bearing sets 408, each including a plurality of bearing elements 410. Each bearing element may be configured, for example, similar to the PCD elements 326 described above with respect to FIGS. 18A-18C and 12. Each bearing set 408 is configured such that the radius of curvature of its collective bearing surface is greater than the radius of the bearing surface of the first bearing ring 402. Thus, a fluid film may form a wedge 412 that causes separation between the first bearing ring 402 and the second bearing ring 404 as will be appreciated by those of ordinary skill in the art and as illustrated in FIG. 28 (and as also illustrated in FIG. 18C with regard to other embodiments).

Figure 29:
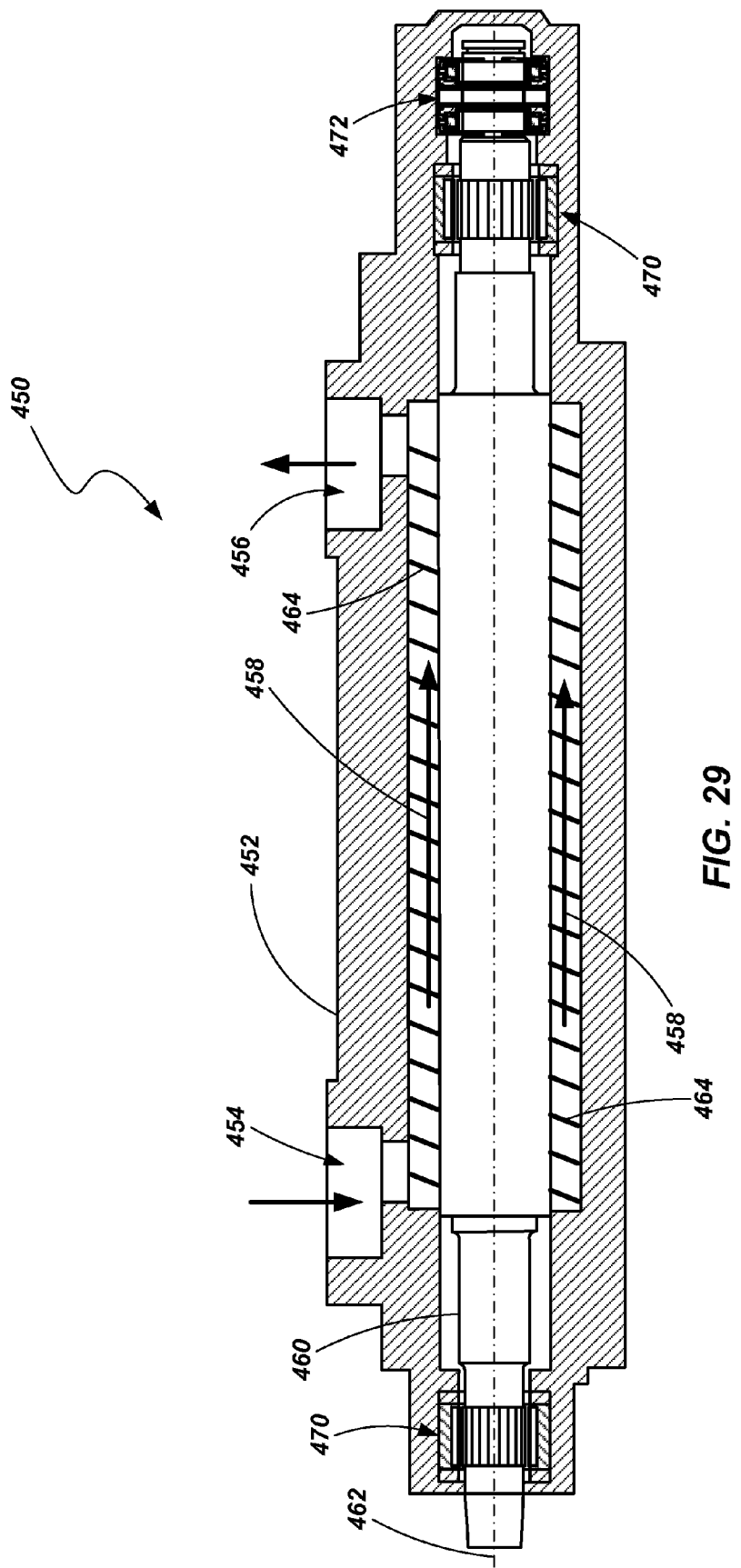
FIG. 29 is a partial cross-sectional view of a pump incorporating various bearing assemblies.

As mentioned above, the bearing apparatuses and assemblies disclosed above may be incorporated into any suitable mechanical system including any suitable rotary drill bit, motor, pump or drilling tool that may include a radial bearing apparatus or thrust bearing apparatus, without limitation. One example of such a mechanical system, without limitation, is shown in FIG. 29 which illustrates a pump 450. The pump 450 includes a housing 452 defining an inlet 454, and outlet 456 and a fluid flow path 458 between the inlet 454 and the outlet 456. A pump shaft 460 is disposed within the housing 452 and configured to rotate about an axis 462 relative to the housing. Impeller structures 464 are coupled with the pump shaft 460 and configured to convey fluid along the flow path 458 from the inlet 454 to the outlet 458 upon rotation of the pump shaft 460.

Various bearings may be used to maintain the position of the pump shaft 460 relative to the housing 452 along the axis 462 while enabling it to rotate about the axis 462. For example, a pair of radial bearings or journal bearings 470, one near each end of the pump shaft 460, may be used to enable relative rotation of the pump shaft 460 and the housing 452 while keeping the pump shaft substantially centered about the axis 462. A thrust bearing 472 may also be incorporated into the pump. For example, a thrust bearing 472 may be disposed near one end of the pump shaft 460 and configured to substantially limit or constrain displacement of the pump shaft 460 along the axis 462 while still enabling rotation of the pump shaft 460 about the axis 462 relative to the pump housing 452.

The radial or journal bearings 470 may be configured, for example, as the bearing assembly 300 described with respect to FIG. 17. The thrust bearing 472 may be configured, for example, as the bearing assembly 100 described with respect to FIG. 1A-1C. Of course, the bearings 470 and 472 may be configured according to other embodiments or include other features described herein as desired.

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. It is additionally noted that features or aspects of any embodiment described herein may be combined with other features or aspects of any other embodiment without limitation.

What is claimed is:

1. A bearing assembly comprising:
   a first tilting pad bearing assembly comprising a body and plurality of tilting pad bearings, each tilting pad bearing comprising a polycrystalline diamond (PCD) layer attached to a base layer, the plurality of tilting pad bearings being circumferentially spaced about the body and defining a first collective bearing surface, the PCD layer of at least one tilting pad bearing includes a plurality of PCD elements each of which is contiguous with an adjacent one of the plurality of PCD elements of the tilting pad bearing to define a first substantially continuous surface;
   a runner bearing comprising a PCD layer comprising a plurality of PCD elements coupled to a base layer defining a second collective bearing surface;
   wherein the first tilting pad bearing assembly and the runner bearing are positioned and configured to move relative to each other with the first collective bearing surface being in contact with the second collective bearing surface, each of the plurality PCD elements of the runner bearing is contiguous with an adjacent one of the plurality of PCD elements to define a substantially continuous surface.

2. The bearing assembly of claim 1, wherein each of the PCD elements of the runner bearing exhibit an annular sector geometry.

3. The bearing assembly of claim 1, wherein at least some of the plurality of PCD elements include a surface exhibiting a substantially square geometry.

4. The bearing assembly of claim 1, wherein at least some of the plurality of PCD elements of the tilting pad bearing include a surface exhibiting a substantially square geometry.

5. The bearing assembly of claim 1, wherein the runner bearing further comprises a second PCD layer comprising another plurality of PCD elements coupled to the base layer defining a third collective bearing surface;
   wherein the bearing assembly further comprises a second tilting pad bearing assembly having a body and plurality of tilting pad bearings, each tilting pad bearing of the second assembly comprising a polycrystalline diamond (PCD) layer attached to a base layer, the plurality of tilting pad bearings of the second assembly being circumferentially spaced about the body of the second assembly and defining a fourth collective bearing surface;
   wherein the second tilting pad bearing assembly and the runner bearing are positioned and configured to move relative to each other with the third collective bearing surface being in contact with the fourth collective bearing surface.

6. The bearing assembly of claim 1, wherein the first tilting pad assembly further comprises a tilting mechanism at least partially disposed in an annular channel defined by the body, and wherein the plurality of tilting pad bearings are positioned on leveling mechanisms.

7. The bearing assembly of claim 6, wherein each of the tilting pad bearings include a protrusion, and wherein each of the tilting pad bearings are positioned such that their protrusions rest on a portion of the leveling mechanism and enable the tilting pad bearings to rotate relative to the body about their respective protrusions.

8. A single tilting pad bearing element comprising:
   a base layer configured to allow the single tilting pad bearing element to tilt about at least one axis;
   a polycrystalline diamond (PCD) layer comprising a plurality of PCD elements coupled with the base layer, each PCD element comprising a substrate and a diamond table, each of the plurality of PCD elements is contiguous with an adjacent one of the plurality of PCD elements to define a substantially continuous surface.

9. The single tilting pad bearing element of claim 8, wherein the substantially continuous surface is shaped as an annular sector.

10. The single tilting pad bearing element of claim 8, wherein the substantially continuous surface exhibits a substantially circular geometry.

11. The single tilting pad bearing element of claim 8, wherein at least some of the plurality of PCD elements include a surface exhibiting a substantially square geometry.

12. The single tilting pad bearing element of claim 8, wherein the base layer comprises tungsten carbide.

13. The single tilting pad bearing element of claim 12, wherein the substrate comprises tungsten carbide.

14. The single tilting pad bearing element of claim 8, wherein the base layer comprises steel.

15. The single tilting pad bearing element of claim 8, further comprising a projection formed on the base layer.

16. The single tilting pad bearing element of claim 15, wherein the projection is centered along a width of the bearing element.

17. The single tilting pad bearing element of claim 15, wherein the projection is offset from a centerline of the bearing element.

18. The single tilting pad bearing element of claim 8, wherein the base layer includes an arcuate surface opposite of the PCD layer.

19. A method of manufacturing a single tilting pad bearing element, the method comprising:
    forming a plurality of polycrystalline diamond compacts (PDCs) under high-pressure, high-temperature conditions, each of the plurality of PDCs includes a diamond table and a substrate;
    attaching each of the plurality of PDCs to a base layer to form the single tilting pad bearing element, wherein the base layer is configured to allow the single tilting pad bearing element to tilt about at least one axis; and arranging the plurality of PDCs to form a substantially continuous bearing surface of the single tilting pad bearing element.

20. The method according to claim 19, further comprising forming at least some of the plurality of PDCs such that their associated diamond tables exhibit substantially square geometries.

21. The method according to claim 19, further comprising forming the substantially continuous bearing surface to exhibit a substantially annular sector geometry.

22. The method according to claim 19, further comprising forming the substantially continuous bearing surface to exhibit a substantially circular geometry.

23. The method according to claim 19, wherein attaching the at least one PDC to the base layer includes brazing the at least one PDC and the base layer.

24. The method according to claim 19, wherein attaching the at least one PDC to the base layer includes e-beam welding the at least one PDC to the base layer.

25. The method according to claim 19, wherein attaching the at least one PDC to the base layer includes clamping the at least one PDC to the base layer.

26. The method according to claim 19, further comprising forming the base layer of tungsten carbide.

27. The method according to claim 19, further comprising forming the substrate of tungsten carbide.

28. The method according to claim 19, further comprising forming the base layer of steel.

\* \* \* \* \*

UNITED STATES PATENT AND TRADEMARK OFFICE
CERTIFICATE OF CORRECTION

PATENT NO. : 8,646,981 B2  Page 1 of 1
APPLICATION NO. : 13/550825
DATED : February 11, 2014
INVENTOR(S) : Peterson et al.

It is certified that error appears in the above-identified patent and that said Letters Patent is hereby corrected as shown below:

IN THE CLAIMS:

In Column 21, Claim 1, Line 42, delete "a substantially" and insert -- a second substantially --, therefor.

Signed and Sealed this
Fourth Day of August, 2015

Michelle K. Lee
*Director of the United States Patent and Trademark Office*